United States Patent
Nagao et al.

(10) Patent No.: US 6,628,811 B1
(45) Date of Patent: Sep. 30, 2003

(54) METHOD AND APPARATUS FOR RECOGNIZING IMAGE PATTERN, METHOD AND APPARATUS FOR JUDGING IDENTITY OF IMAGE PATTERNS, RECORDING MEDIUM FOR RECORDING THE PATTERN RECOGNIZING METHOD AND RECORDING MEDIUM FOR RECORDING THE PATTERN IDENTITY JUDGING METHOD

(75) Inventors: Kenji Nagao, Yokohama (JP); Masaki Soma, Yokohama (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/271,387

(22) Filed: Mar. 18, 1999

(30) Foreign Application Priority Data

Mar. 19, 1998 (JP) .......................................... 10-070143
Jul. 16, 1998 (JP) .......................................... 10-201573

(51) Int. Cl.$^7$ ................................................ G06K 9/00
(52) U.S. Cl. ...................... 382/118; 382/190; 382/228; 382/276
(58) Field of Search ................................ 382/115, 118, 382/116, 206, 190, 224, 228, 276; 356/71; 340/5.53, 5.83; 713/186, 200; 707/6; 902/3, 6; 706/20

(56) References Cited

U.S. PATENT DOCUMENTS 5,842,194 A  * 11/1998  Arbuckle ..................... 706/52
RE36,041 E   *  1/1999  Turk et al. ................... 382/118
6,345,109 B1 *  2/2002  Souma et al. ............... 382/118

FOREIGN PATENT DOCUMENTS

JP           10-171988 A  *  6/1998  ............ G06T/7/00

OTHER PUBLICATIONS

Nagao et al., Weak Orthogonalization of Face and Perturbation for recofinition, IEEE Computer Society Conference on Computer Vision and Pattern Recognition, Jun. 1988, pp. 845–852.*

(List continued on next page.)

*Primary Examiner*—Brian Werner

(57) ABSTRACT

A plurality of teaching identification face image patterns of teaching persons are obtained in a first pattern obtaining process using an image scanner, and a plurality of teaching video face image patterns of the teaching persons are obtained in a second pattern obtaining process using a video camera. A feature extraction matrix, which minimizes an overlapping area between a pattern distribution of the teaching identification face image patterns and a perturbation distribution between a group of teaching identification face image patterns and a group of teaching video face image patterns, is calculated. In cases where a feature extraction using the feature extraction matrix is performed for referential face image patterns of registered persons obtained in the first pattern obtaining process, referential feature pattern vectors independent of any pattern obtaining process are obtained. When an input face image pattern of a specific person obtained in the second pattern obtaining process is received, the feature extraction is performed for the input face image pattern to obtain an input feature pattern vector independent of any pattern obtaining process. Therefore, the specific person can be recognized as a specific registered person by selecting a specific referential feature pattern vector most similar to the input feature pattern vector.

29 Claims, 12 Drawing Sheets

OTHER PUBLICATIONS

USPTO Translation of Sohma et al., Robust Face Recognition Under Drastic Changes of Conditions of Image Acquisition, Transactions of the Institute of Electronics, Information and Communications Engineers, D–II, Aug. 1997, translation pp. 1–16.*

Database Inspec 'Online! Institute of Electrical Engineers, Stevenage, GB; Sohma M. et al.: "Robust face recognition under drastic changes of conditions of image acquisition" Database accession No. 5701998 XP002181630.

Kittler J. et al.: "A New Approach to Feature Selection Based on the Karhunen–Loeve Expantion" Pattern Recognition, Pergamon Press Inc. Elmsford, N.Y., US, vol. 5, No. 4, Dec. 1, 1973, pp. 335–352, XP0000198393 ISSN: 0031–3203.

"Eigenfaces for Recognitin" by Turk et al; Journal of Cognitive Neuroscience vol. 3, No. 1; 1991, pp., 71–86.

* cited by examiner

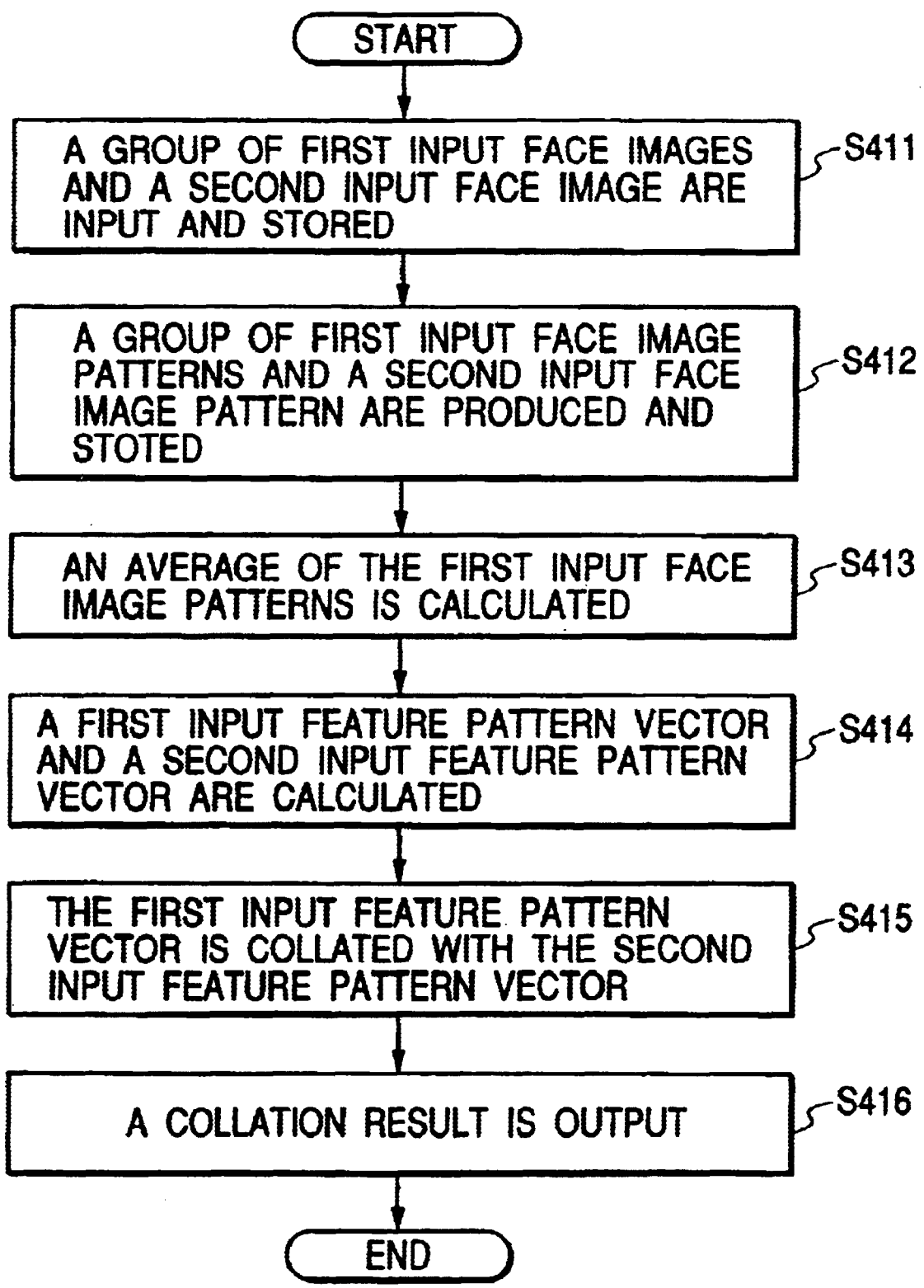

METHOD AND APPARATUS FOR RECOGNIZING IMAGE PATTERN, METHOD AND APPARATUS FOR JUDGING IDENTITY OF IMAGE PATTERNS, RECORDING MEDIUM FOR RECORDING THE PATTERN RECOGNIZING METHOD AND RECORDING MEDIUM FOR RECORDING THE PATTERN IDENTITY JUDGING METHOD

BACKGROUND OF THE INVENTION

1. Field of the Invention

The present invention relates to a pattern recognizing method and a pattern recognizing apparatus in which an image or a speech is recognized, a pattern identity judging method and a pattern identity judging apparatus in which it is judged according to the pattern recognizing method whether or not an image or a speech is identical with another image or another speech, a recording medium for recording a software program of the pattern recognition and a recording medium for recording a software program of the pattern identity judging method.

2. Description of the Related Art

In a technical field of a pattern recognition such as a face image recognition or a speech recognition, second order statistics (or covariances) of model patterns are calculated from a set of model patterns registered in a data base in advance, a pattern data space is made from the second order statistics, a distribution of an input pattern in the pattern data space (that is, the portion occupied by an input pattern in the pattern data space) is assumed, and features of the input pattern are extracted to recognize the input pattern.

2.1. Previously Proposed Art:

For example, features of the input pattern are extracted according to a well-known Karhunen-Loeve (KL) expansion method. This feature extraction is, for example, disclosed in a literature "M. Turk, A. Pentland, "Eigenfaces for Recognition", Journal of Congnitive Neuroscience Volume 3, Number 1, 1991". Though there are various other methods than the KL expansion method, the other methods are based on the KL expansion method.

In the KL expansion method, each of two patterns Pa and Pb is approximated by a linear combination of basis vectors (the number of vectors is N) Ei (i=1, 2, - - - , N) to produce an approximated pattern, and the collation between the patterns Pa and Pb is performed by using approximated patterns A and B. The approximated patterns A and B are formulated as follows.

$$A = \sum_{i=1}^{N} \alpha i E i \quad (1)$$

$$B = \sum_{i=1}^{N} \beta i E i$$

In the KL expansion method, a covariance matrix is obtained from W pieces of teaching pattern data, an eigenvalue is calculated for each eigenvector of the covariance matrix, N eigenvectors corresponding to N higher eigenvalues (the number N is, for example, 100) are selected as N basis vectors Ei from all eigenvectors of the covariance matrix.

In cases where a pattern data space is defined by the N basis vectors, there are two merits.

(1) The W teaching pattern data projected on each plane defined by two basis vectors are separated from each other to a highest degree. Therefore, the W teaching pattern data can be easily distinguished from each other.

(2) Noises included in the patterns Pa and Pb and changes occurring randomly in the patterns Pa and Pb can be removed.

In the KL expansion method, it is supposed that an assuming precision for distribution parameters calculated from a pattern model set is sufficiently high. For example, in a face image recognition, in cases where a statistic property in a process for obtaining a pattern set agrees with that in a process for obtaining another pattern set, many examinations indicate that a pattern recognition can be performed at a very high precision rate and the collation of the pattern sets can be correctly performed.

2.2. Problems to be Solved by the Invention:

However, in cases where features of a model pattern are extracted according to two types of image receiving processes, there is a case that a first set of teaching pattern data obtained from the model pattern according to the first process greatly differs from a second set of teaching pattern data obtained from the same model pattern according to the second process, so that a statistic property for the first set of teaching pattern data greatly differs from that for the second set of teaching pattern data. For example, in cases where a lighting condition for photographing a first pattern differs from that for photographing a second pattern, there is a case that a statistic property for a first set of pattern data obtained from the first pattern differs from that for a second set of pattern data obtained from the second pattern. As a result, even though features of the first pattern agree with those of the second pattern, because an image recognition for the first and second sets of pattern data is not performed with sufficiently high precision, the collation of the first and second sets of pattern data with each other is not correctly performed, and the identity of the first pattern with the second pattern cannot be judged.

The above problem is based on the supposition that two pattern data sets compared with each other are derived from the common distribution (or the common statistic parameters). Therefore, in cases where two pattern data sets compared with each other are derived from different distributions (or different statistic parameters), the KL expansion method cannot be properly performed in the pattern recognition or the pattern collation.

SUMMARY OF THE INVENTION

A first object of the present invention is to provide, with due consideration to the drawbacks of such conventional pattern recognizing method and apparatus, pattern recognizing method and apparatus in which an input pattern identical with one of referential patterns is recognized with high precision even though a process for obtaining the input pattern of an input sample differs from a process for obtaining the referential patterns from referential samples.

A second object of the present invention is to provide pattern identity judging method and apparatus in which the identity of a first input pattern obtained according to a first process with a second input pattern obtained according to a second process is correctly judged regardless of a statistic property difference between the first and second input patterns occurred according to a difference between the first and second processes.

A third object of the present invention is to provide a recording medium in which a software program of the pattern recognizing method or a software program of the pattern identity judging method is recorded.

The first object is achieved by the provision of a pattern recognizing method, comprising the steps of:

obtaining a set of first teaching patterns of a plurality of teaching samples according to a first pattern obtaining process;

obtaining a set of second teaching patterns of the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

obtaining a set of referential patterns of a plurality of referential samples according to the first pattern obtaining process;

calculating a set of referential feature patterns of the referential samples from the set of referential patterns according to the feature extraction matrix, the set of referential feature patterns being independent of the first pattern obtaining process and the second pattern obtaining process;

receiving an input pattern of an input sample according to the second pattern obtaining process;

calculating an input feature pattern of the input sample from the input pattern according to the feature extraction matrix;

selecting a specific referential feature pattern most similar to the input feature pattern from the set of referential feature patterns; and recognizing a specific referential sample corresponding to the specific referential feature pattern as the input sample.

The first object is also achieved by the provision of a pattern recognizing apparatus, comprising:

first pattern obtaining means for obtaining a set of first teaching patterns of a plurality of teaching samples according to a first pattern obtaining process;

second pattern obtaining means for obtaining a set of second teaching patterns of the teaching samples according to a second pattern obtaining process differing from the first pattern obtaining process;

feature extracting means for calculating a teaching pattern distribution from the set of first teaching patterns obtained by the first pattern obtaining means or the set of second teaching patterns obtained by the second pattern obtaining means, calculating a teaching distribution of a perturbation between the set of first teaching patterns and the set of second teaching patterns, and calculating a feature extraction matrix, which minimizes an overlapping area between the teaching pattern distribution and the teaching perturbation distribution, from the teaching pattern distribution and the teaching perturbation distribution;

referential feature pattern calculating means for obtaining a set of referential patterns of a plurality of referential samples according to the first pattern obtaining process, and calculating a set of referential feature patterns of the referential samples from the set of referential patterns according to the feature extraction matrix calculated by the feature extracting means to make the set of referential feature patterns independent of the first pattern obtaining process and the second pattern obtaining process; and input pattern recognizing means for receiving an input pattern of an input sample according to the second pattern obtaining process, calculating an input feature pattern of the input sample from the input pattern according to the feature extraction matrix calculated by the feature extracting means, selecting a specific referential feature pattern most similar to the input feature pattern from the set of referential feature patterns calculated by the referential feature pattern calculating means, and recognizing a specific referential sample corresponding to the specific referential feature pattern as the input sample.

In the above steps and configuration, in cases where a pattern obtaining process adopted to obtain a set of first patterns differs from a pattern obtaining process adopted to obtain a set of second patterns, a statistic property difference between the set of first patterns and the set of second patterns is generated. Therefore, even though one first pattern and one second pattern are obtained from the same sample, it is difficult to judge that the first pattern is identical with the second pattern.

In the present invention, a feature extraction matrix, which minimizes an overlapping area between the teaching pattern distribution and the teaching perturbation distribution, is calculated. Therefore, in cases where a feature extraction transformation using the feature extraction matrix is performed for the set of referential patterns to calculate the set of referential feature patterns, a referential pattern distribution and a referential perturbation distribution in the set of referential feature patterns has the same group of distribution axes and become orthogonal to each other, so that perturbation components coming in the set of referential patterns can be removed in the set of referential feature patterns. This removal of the perturbation components from the set of referential patterns denotes that the set of referential feature patterns becomes independent of the first pattern obtaining process and the second pattern obtaining process. Also, the input feature pattern becomes independent of the first pattern obtaining process and the second pattern obtaining process.

Accordingly, a specific referential sample corresponding to a specific referential feature pattern most similar to the input feature pattern can be correctly recognized as the input sample regardless of the first pattern obtaining process and the second pattern obtaining process.

It is preferred that the step of calculating a teaching pattern distribution comprise the step of assuming a teaching pattern covariance matrix of a pattern sample space as the teaching pattern distribution, the step of calculating a teaching distribution of a perturbation comprise the steps of calculating a teaching pattern perturbation between one first teaching pattern of one teaching sample and one second teaching pattern of the teaching sample for each teaching sample; and assuming a teaching perturbation covariance matrix from the teaching pattern perturbations as the teaching perturbation distribution, and the step of calculating a feature extraction matrix comprise the steps of calculating a both-diagonalizing matrix, which diagonalizes both the teaching pattern covariance matrix and the teaching perturbation covariance matrix, from the teaching pattern covariance matrix and the teaching perturbation covariance matrix;

diagonalizing the teaching pattern covariance matrix according to the both-diagonalizing matrix to produce a diagonal matrix of the teaching pattern covariance matrix;

diagonalizing the teaching perturbation covariance matrix according to the both-diagonalizing matrix to produce a diagonal matrix of the teaching perturbation covariance matrix;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and calculating the feature extraction matrix from the both-diagonalizing matrix and the amplitude re-transformation matrix.

Also, it is preferred that the feature extracting means comprise pattern covariance assuming means for calculating a teaching pattern covariance matrix of a pattern sample space from the first teaching patterns or the second teaching patterns and assuming the teaching pattern covariance matrix as the teaching pattern distribution;

pattern perturbation calculating means for calculating a teaching pattern perturbation between one first teaching pattern of one teaching sample and one second teaching pattern of the teaching sample for each teaching sample;

perturbation covariance assuming means for assuming a teaching perturbation covariance matrix from the teaching pattern perturbations calculated by the pattern perturbation calculating means as the teaching perturbation distribution;

both-diagonalizing matrix calculating means for calculating a both-diagonalizing matrix, which diagonalizes both the teaching pattern covariance matrix assumed by the pattern covariance assuming means and the teaching perturbation covariance matrix assumed by the perturbation covariance assuming means, from the teaching pattern covariance matrix and the teaching perturbation covariance matrix;

diagonal matrix producing means for diagonalizing the teaching pattern covariance matrix assumed by the pattern covariance assuming means according to the both-diagonalizing matrix calculated by the both-diagonalizing matrix calculating means to produce a diagonal matrix of the teaching pattern covariance matrix, and diagonalizing the teaching perturbation covariance matrix assumed by the perturbation covariance assuming means according to the both-diagonalizing matrix to produce a diagonal matrix of the teaching perturbation covariance matrix;

amplitude re-transformation matrix calculating means for calculating an amplitude re-transformation matrix, which again transforms a referential pattern covariance matrix indicated by the set of referential feature patterns to be calculated by the referential feature pattern calculating means to adjust amplitudes of diagonal elements of the referential pattern covariance matrix after the referential pattern covariance matrix is transformed by the both-diagonalizing matrix calculated by the both-diagonalizing matrix calculating means to be diagonalized, from the diagonal matrices; and calculating the feature extraction matrix from the both-diagonalizing matrix calculated by the both-diagonalizing matrix calculating means and the amplitude re-transformation matrix calculated by the amplitude re-transformation matrix calculating means.

In the above steps and configuration, the teaching pattern covariance matrix derived from the set of first teaching patterns and the teaching perturbation covariance matrix derived from the set of first teaching patterns and the set of second teaching patterns have the same group of eigenvectors by diagonalizing the teaching pattern covariance matrix and the teaching perturbation covariance matrix by using the both-diagonalizing matrix. In addition, the diagonal elements of the teaching pattern covariance matrix and the diagonal elements of the teaching perturbation covariance matrix are adjusted by using the amplitude re-transformation matrix, so that not only the teaching pattern covariance matrix and the teaching perturbation covariance matrix have the same group of eigenvectors, but also the order of the eigenvectors arranged in the order of decreasing eigenvalues (or variance values) in the teaching pattern covariance matrix can be set to the reverse of the order of the eigenvectors arranged in the order of decreasing eigenvalues (or variance values) in the teaching perturbation covariance matrix.

Therefore, in cases where a feature extraction transformation using the feature extraction matrix is performed for the teaching pattern covariance matrix indicating a pattern distribution of the first teaching patterns and the teaching perturbation covariance matrix indicating a perturbation distribution between the set of first teaching patterns and the set of second teaching patterns, a pattern sample space occupied by the pattern distribution has the same group of distribution axes (or the same group of basic vectors) as those of a pattern sample space occupied by the perturbation distribution, and the order of the spreading degrees of the pattern distribution in directions of the axes is the reverse of the order of the spreading degrees of the perturbation distribution in directions of the axes. This reverse relationship in the spreading degrees between the pattern distribution and the perturbation distribution indicates a condition that the pattern distribution is orthogonal to the perturbation distribution, and an overlapping area between the pattern distribution and the perturbation distribution is minimized. The minimization of the overlapping area indicates that perturbation components coming in the pattern sample space of the first teaching patterns are effectively removed. Because the perturbation components denote a statistic property difference between the first teaching patterns and the second teaching patterns, a pattern recognition independent of a statistic property difference between the first obtaining process and the second obtaining process can be performed in cases where a feature extraction transformation using the feature extraction matrix is performed for the first teaching patterns.

Also, it is preferred that the step of calculating a teaching distribution of a perturbation comprise the step of calculating a teaching perturbation distribution between one first teaching pattern of one teaching sample and one second teaching pattern of the teaching sample for each teaching sample, the step of calculating a feature extraction matrix comprise the step of calculating a feature extraction matrix, which minimizes an overlapping area between a teaching pattern distribution of one teaching sample and the teaching perturbation distribution of the teaching sample, from the teaching pattern distribution and the teaching perturbation distribution of the teaching sample for each teaching sample, the step of obtaining a set of referential patterns comprise the step of obtaining a set of referential patterns of the teaching samples according to the first pattern obtaining process or the second pattern obtaining process, the step of calculating a set of referential feature patterns comprise the step of calculating one referential feature pattern of one teaching sample from one referential pattern of the teaching sample according to the feature extraction matrix of the teaching sample for each teaching sample, the step of calculating an input feature pattern comprise the step of calculating an input feature pattern of the input sample from the input pattern according to the feature extraction matrix of one teaching sample for each teaching sample, and the step of selecting a specific referential feature pattern comprise the steps of estimating a similarity between one input feature pattern corresponding to one teaching sample and one referential feature pattern of the same teaching sample; and selecting a specific referential feature pattern of a specific teaching sample most similar to the input feature pattern corresponding to the teaching sample from the set of referential feature patterns.

Also, the first object is achieved by the provision of a pattern recognizing apparatus, comprising:

first pattern obtaining means for obtaining a set of first teaching patterns of a plurality of registered samples according to a first pattern obtaining process;

second pattern obtaining means for obtaining a set of second teaching patterns of the registered samples according to a second pattern obtaining process differing from the first pattern obtaining process;

feature extracting means for calculating a teaching pattern distribution from the first teaching patterns obtained by the first pattern obtaining means or the second teaching patterns obtained by the second pattern obtaining means, calculating a teaching distribution of a perturbation between one first teaching pattern of one registered sample and one second teaching pattern of the registered sample for each registered sample, and calculating a feature extraction matrix, which minimizes an overlapping area between the teaching pattern distribution of one registered sample and the teaching perturbation distribution of the registered sample, from the teaching pattern distribution and the teaching perturbation distribution for each registered sample;

referential feature pattern calculating means for obtaining a set of referential patterns of the registered samples according to the first pattern obtaining process, and calculating a referential feature pattern of one registered sample from one referential pattern of the registered sample according to the feature extraction matrix of the registered sample calculated by the feature extracting means for each registered sample to make each referential feature pattern independent of the first pattern obtaining process and the second pattern obtaining process; and input pattern recognizing means for receiving an input pattern of an input sample according to the second pattern obtaining process, calculating an input feature pattern corresponding to one registered sample from the input pattern according to the feature extraction matrix of the registered sample calculated by the feature extracting means for each registered sample, estimating a similarity between one referential feature pattern of one registered sample and the input feature pattern corresponding to the registered sample for each registered sample, selecting a specific referential feature pattern most similar to the input feature pattern from the referential feature patterns calculated by the referential feature pattern calculating means, and recognizing a specific registered sample corresponding to the specific referential feature pattern as the input sample.

In the above steps and configuration, a teaching perturbation distribution between one first teaching pattern of one teaching sample and one second teaching pattern of the teaching sample is calculated for each teaching sample, a feature extraction matrix is calculated for each teaching sample, and one referential feature pattern corresponding to one teaching sample is calculated from one referential pattern of the registered sample according to the first pattern obtaining process by using the feature extraction matrix for each teaching sample. Therefore, each referential feature pattern becomes independent of the first pattern obtaining process and the second pattern obtaining process.

When an input pattern of an input sample is received according to the second pattern obtaining process, because an input feature pattern is calculated from the input pattern according to the feature extraction matrix for each registered sample, each input feature pattern becomes independent of the first pattern obtaining process and the second pattern obtaining process.

Accordingly, even though the pattern obtaining process for obtaining the input pattern differs from that for obtaining the referential patterns, in cases where a similarity between one referential feature pattern and one input feature pattern is estimated for each registered sample, a specific referential feature pattern most similar to the input feature pattern can be selected from the referential feature patterns, and a specific registered sample corresponding to the specific referential feature pattern can be recognized as the input sample.

The second object is achieved by the provision of a pattern identity judging method, comprising the steps of:

obtaining a set of first teaching patterns of a plurality of teaching samples according to a first pattern obtaining process;

obtaining a set of second teaching patterns of the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

receiving a first input pattern of a first input sample according to the first pattern obtaining process;

calculating a first input feature pattern of the first input sample from the first input pattern according to the feature extraction matrix, the first input feature pattern being independent of the first pattern obtaining process and the second pattern obtaining process;

receiving a second input pattern of a second input sample according to the second pattern obtaining process;

calculating a second input feature pattern of the second input sample from the second input pattern according to the feature extraction matrix, the second input feature pattern being independent of the first pattern obtaining process and the second pattern obtaining process;

collating the first input feature pattern with the second input feature pattern to estimate a similarity between the first input sample and the second input sample; and judging that the first input sample is identical with the second input sample in cases where the similarity is high.

The second object is also achieved by the provision of a pattern identity judging apparatus, comprising:

first pattern obtaining means for obtaining a set of first teaching patterns of a plurality of teaching samples according to a first pattern obtaining process;

second pattern obtaining means for obtaining a set of second teaching patterns of the teaching samples according to a second pattern obtaining process differing from the first pattern obtaining process;

feature extracting means for calculating a teaching pattern distribution from the set of first teaching patterns obtained by the first pattern obtaining means or the set of second teaching patterns obtained by the second pattern obtaining means, calculating a teaching distribution of a perturbation between the set of first teaching patterns and the set of second teaching patterns, and calculating a feature extraction matrix, which minimizes an overlapping area between the teaching pattern distribution and the teaching perturbation distribution, from the teaching pattern distribution and the teaching perturbation distribution;

feature pattern calculating means for receiving a first input pattern of a first input sample according to the first pattern obtaining process, receiving a second input pattern of a second input sample according to the second pattern obtaining process, calculating a first input feature pattern of the first input sample from the first input pattern according to the feature extraction matrix calculated by the feature extracting means to make the first input feature pattern independent of the first pattern obtaining process and the second pattern obtaining process, and calculating a second input feature pattern of the second input sample from the second input pattern according to the feature extraction matrix to make the second input feature pattern independent of the first pattern obtaining process and the second pattern obtaining process; and identity judging means for collating the first input feature pattern calculated by the feature pattern calculating means with the second input feature pattern calculated by the feature pattern calculating means to estimate a similarity between the first input sample and the second input sample, and judging that the first input sample is identical with the second input sample in cases where the similarity is high.

In the above steps and configuration, the feature extraction matrix is calculated in the same manner as in the pattern recognizing method. Therefore, the first input feature pattern and the second input feature pattern calculated by using the feature extraction matrix are independent of the first pattern obtaining process and the second pattern obtaining process. In this case, because the first input feature pattern derived from the first pattern obtaining process can correctly collate with the second input feature pattern derived from the second pattern obtaining process, in cases where the first input sample is actually identical with the second input sample, the judgement that the first input sample is identical with the second input sample can be reliably performed.

The second object is also achieved by the provision of a pattern identity judging apparatus, comprising:

first pattern obtaining means for obtaining a set of first teaching patterns of a plurality of teaching samples according to a first pattern obtaining process;

second pattern obtaining means for obtaining a group of second teaching patterns according to a second pattern obtaining process differing from the first pattern obtaining process for each teaching sample;

feature extracting means for calculating a teaching pattern distribution from the set of first teaching patterns obtained by the first pattern obtaining means or the groups of second teaching patterns obtained by the second pattern obtaining means, calculating a teaching distribution of a perturbation between one first teaching pattern of one teaching sample and the group of second teaching patterns of the teaching sample for each teaching sample, calculating an average teaching perturbation distribution from the teaching perturbation distributions, and calculating a feature extraction matrix, which minimizes an overlapping area between the teaching pattern distribution and the average teaching perturbation distribution, from the teaching pattern distribution and the average teaching perturbation distribution;

feature pattern calculating means for receiving a first input pattern of a first input sample according to the first pattern obtaining process, receiving a second input pattern of a second input sample according to the second pattern obtaining process, calculating a first input feature pattern of the first input sample from the first input pattern according to the feature extraction matrix calculated by the feature extracting means to make the first input feature pattern independent of the first pattern obtaining process and the second pattern obtaining process, and calculating a second input feature pattern of the second input sample from the second input pattern according to the feature extraction matrix to make the second input feature pattern independent of the first pattern obtaining process and the second pattern obtaining process; and identity judging means for collating the first input feature pattern calculated by the feature pattern calculating means with the second input feature pattern calculated by the feature pattern calculating means to estimate a similarity between the first input sample and the second input sample, and judging that the first input sample is identical with the second input sample in cases where the similarity is high.

In the above configuration, a group of second teaching patterns are obtained according to a second pattern obtaining process for each teaching sample, a teaching perturbation distribution between one first teaching pattern of one teaching sample and the group of second teaching patterns of the teaching sample is calculated for each teaching sample, an average teaching perturbation distribution is calculated from the teaching perturbation distributions, and a feature extraction matrix is calculated from the teaching pattern distribution and the average teaching perturbation distribution.

Therefore, even though the pattern obtaining process for obtaining a first input pattern of a first input sample differs from that for obtaining a second input pattern of a second input sample, because a first input feature pattern of the first input sample and a second input feature pattern of the second input sample are calculated according to the feature extraction matrix, the first input feature pattern and the second input feature pattern become independent of the first pattern obtaining process and the second pattern obtaining process.

Accordingly, in cases where the first input feature pattern is collated with the second input feature pattern to estimate a similarity between the first input sample and the second input sample, and the judgement whether or not the first input sample is identical with the second input sample can be performed according to the similarity.

The third object is achieved by the provision of a recording medium for recording a software program of a pattern recognizing method executed in a computer, the pattern recognizing method, comprising the steps of:

obtaining a set of first teaching patterns of a plurality of teaching samples according to a first pattern obtaining process;

obtaining a set of second teaching patterns of the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

obtaining a set of referential patterns of a plurality of referential samples according to the first pattern obtaining process or the second pattern obtaining process;

calculating a set of referential feature patterns of the referential samples from the set of referential patterns according to the feature extraction matrix, the set of referential feature patterns being independent of the first pattern obtaining process and the second pattern obtaining process;

receiving an input pattern of an input sample according to the first pattern obtaining process or the second pattern obtaining process;

calculating an input feature pattern of the input sample from the input pattern according to the feature extraction matrix;

selecting a specific referential feature pattern most similar to the input feature pattern from the set of referential feature patterns; and recognizing a specific referential sample corresponding to the specific referential feature pattern as the input sample.

In the above recording medium, a software program of the pattern recognizing method can be recorded. Therefore, the software program of the pattern recognizing method can be executed in a computer.

The third object is also achieved by the provision of a recording medium for recording a software program of a pattern identity judging method executed in a computer, the pattern identity judging method, comprising the steps of:

obtaining a set of first teaching patterns from a plurality of teaching samples according to a first pattern obtaining process;

obtaining a set of second teaching patterns from the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

receiving a first input pattern of a first input sample according to the first pattern obtaining process;

calculating a first input feature pattern of the first input sample from the first input pattern according to the feature extraction matrix, the first input feature pattern being independent of the first pattern obtaining process and the second pattern obtaining process;

receiving a second input pattern of a second input sample according to the second pattern obtaining process;

calculating a second input feature pattern of the second input sample from the second input pattern according to the feature extraction matrix, the second input feature pattern being independent of the first pattern obtaining process and the second pattern obtaining process;

collating the first input feature pattern with the second input feature pattern to estimate a similarity between the first input sample and the second input sample; and judging that the first input sample is identical with the second input sample in cases where the similarity is high.

In the above recording medium, a software program of the pattern identity judging method can be recorded. Therefore, the software program of the pattern identity judging method can be executed in a computer.

BRIEF DESCRIPTION OF THE DRAWINGS

The objects, features and advantages of the present invention will be apparent from the following description taken in conjunction with the accompanying drawings, in which:

FIG. 17 shows an operation flow in an on-line processing performed in the pattern recognizing apparatus according to the fourth embodiment.

DETAILED DESCRIPTION OF THE EMBODIMENTS

Preferred embodiments of pattern recognizing method and apparatus, pattern identity judging method and apparatus and recording mediums according to the present invention are described with reference to the drawings.

First Embodiment

Figure 1:
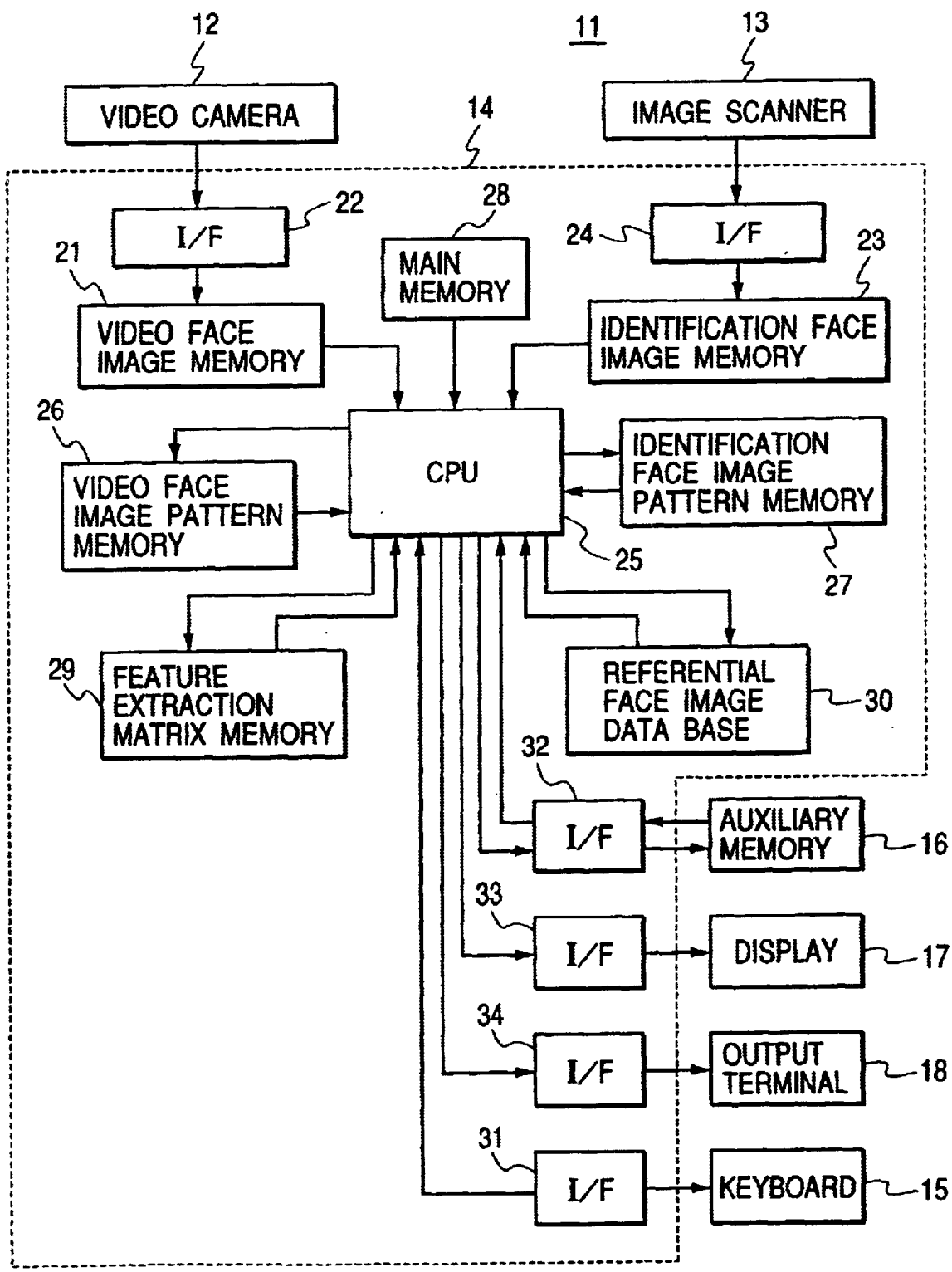
FIG. 1 is a block diagram showing a hardware of a pattern recognizing apparatus additionally functioning as a pattern identity judging apparatus according to the present invention.

FIG. 1 is a block diagram showing a hardware of a pattern recognizing apparatus additionally functioning as a pattern identity judging apparatus according to the present invention.

As shown in FIG. 1, a pattern recognizing apparatus 11 additionally functioning as a pattern identity judging apparatus comprises a video camera 12 for directly photographing a face of each of a plurality of teaching persons in a teaching image pattern obtaining process to obtain a plurality of teaching video face images and directly photographing a face of a specific person in an image identity judging process to obtain an input face image;

an image scanner 13 for scanning a face photograph of an identification card of each teaching person in the teaching image pattern obtaining process to obtain a plurality of teaching identification face images and scanning an identification face photograph of each of a plurality of registered persons in a referential image pattern obtaining process to obtain a plurality of referential identification face images;

a computer system 14 for performing a pattern recognizing method according to the teaching video face images obtained by using the video camera 12 and the teaching identification face images and the referential identification face images obtained by using the image scanner 13 and performing a pattern identity judging method to collate the input face image obtained by using the video camera 12 with each referential identification face image and to identify the specific person; a keyboard 15 for inputting an instruction of an operator to the computer system 14;

an auxiliary memory 16, embodied by an optical magnetic disc or the like, for registering a plurality of referential persons as members;

a display 17 for displaying a face image determined in the computer system 14 as a recognized result or a collated result; and an output terminal 18 for outputting the face image determined in the computer system 14.

The computer system 14 comprises a video face image memory 21 for temporarily storing the teaching video face images and the input face image transmitted from the video camera 12 through an interface (I/F) 22;

an identification face image memory 23 for temporarily storing the teaching identification face images and the referential identification face images transmitted from the image scanner 13 through an interface (I/F) 24;

a central processing unit (CPU) 25 for converting each teaching video face image stored in the video face image memory 21 into a teaching video face image pattern expressed by a one-dimensional data string (or expressed by a pattern vector), converting each teaching identification face image stored in the identification face image memory 23 into a teaching identification face image pattern expressed by a one-dimensional data string (or expressed by a pattern vector), producing a feature extraction matrix F from the teaching video face image patterns and the teaching identification face image patterns, producing a referential identification face image pattern from each referential identification face image stored in the identification face image memory 23, producing a referential face image pattern from each referential identification face image pattern and the feature extraction matrix F, converting the input face image stored in the video face image memory 21 into an input face image pattern expressed by a one-dimensional data string (or expressed by a pattern vector), collating the input face image pattern with each referential face image pattern to judge whether or not the input face image pattern is identical with the referential face image pattern, and judging that the specific person agrees with a specific registered person in cases where the input face image pattern is identical with the referential face image pattern corresponding to the specific registered person;

a video face image pattern memory 26 for storing the teaching video face image patterns and the input face image pattern obtained in the CPU 25;

an identification face image pattern memory 27 for storing the teaching identification face image patterns and the referential face image patterns obtained in the CPU 25;

a main memory 28, including a work area, for storing various software programs (including a software program of a pattern recognizing method or a software program of a pattern identity judging method) used in the CPU 25;

a feature extraction matrix memory 29 for storing the feature extraction matrix F produced in the CPU 25;

a referential face image data base 30 for storing the referential face image data produced in the CPU 25;

an interface (I/F) 31 connecting the keyboard 15 with the computer system 14;

an interface (I/F) 32 connecting the auxiliary memory 16 with the computer system 14;

an interface (I/F) 33 connecting the display 17 with the computer system 14; and an interface (I/F) 34 connecting the output terminal 18 with the computer system 14.

Figure 2:
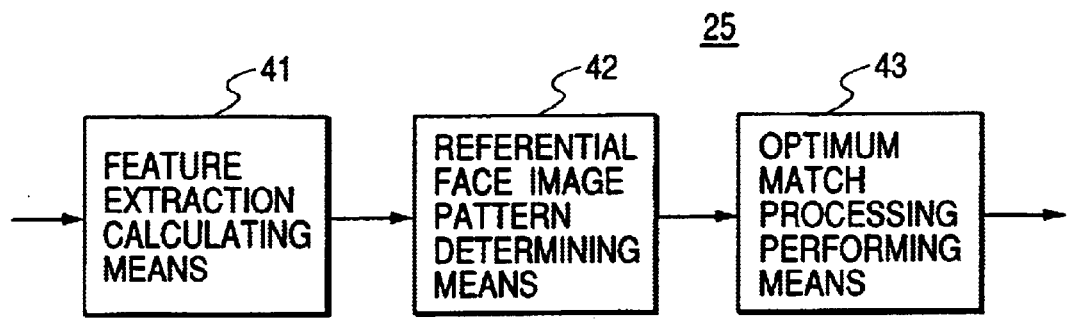
FIG. 2 is a block diagram showing a functional structure of a processing unit (CPU) arranged in the pattern recognizing apparatus according to a first embodiment of the present invention.

FIG. 2 is a block diagram showing a functional structure of the CPU 25 according to a first embodiment of the present invention.

As shown in FIG. 2, the CPU 25 comprises a feature extraction calculating means 41 for calculating the feature extraction matrix F from the teaching video face images and the teaching identification face images;

a referential face image pattern determining means 42 for determining the referential face image patterns from the referential face images according to the feature extraction matrix F calculated in the feature extraction calculating means 41; and an optimum match processing performing means 43 for performing an optimum match processing to judge whether or not the input face image pattern of the specific person is identical with the referential face image pattern corresponding to one registered person.

Figure 3:
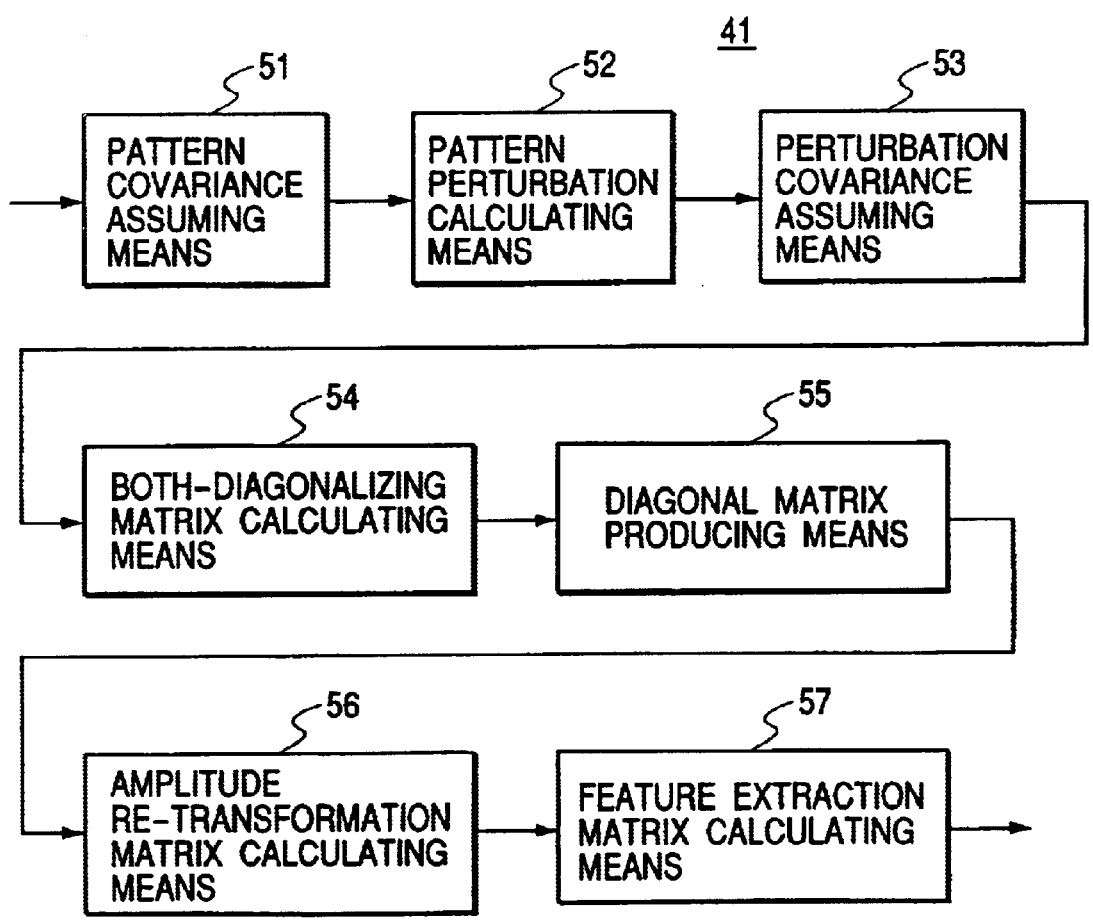
FIG. 3 is a block diagram of a feature extraction matrix calculating means arranged in the CPU according to the first embodiment.

FIG. 3 is a block diagram of the feature extraction matrix calculating means 41.

As shown in FIG. 3, the feature extraction calculating means 41 comprises a pattern covariance assuming means 51 for assuming a pattern covariance matrix Cs of a pattern sample space from a set of the teaching video face image patterns and/or a set of the teaching identification face image patterns;

a pattern perturbation calculating means 52 for calculating a pattern perturbation Pi denoting a statistic property difference between one teaching video face image pattern and one teaching identification face image pattern corresponding to one teaching person selected as a perturbation sample person for each perturbation sample person;

a perturbation covariance assuming means 53 for assuming a covariance matrix Cp of the pattern perturbations Pi calculated in the pattern perturbation calculating means 52;

a both-diagonalizing matrix calculating means 54 for calculating a both-diagonalizing matrix H, which diagonalizes both the pattern covariance matrix Cs and the perturbation covariance matrix Cp, from the pattern covariance matrix Cs assumed in the pattern covariance assuming means 51 and the perturbation covariance matrix Cp assumed in the perturbation covariance assuming means 53;

a diagonal matrix producing means 55 for diagonalizing the pattern covariance matrix Cs according to the both-diagonalizing matrix H calculated in the both-diagonalizing matrix calculating means 54 to produce a diagonal matrix Ds of the pattern covariance matrix Cs and diagonalizing the perturbation covariance matrix Cp according to the both-diagonalizing matrix H to produce a diagonal matrix Dp of the perturbation covariance matrix Cp;

an amplitude re-transformation matrix calculating means 56 for calculating an amplitude re-transformation matrix L, which again transforms a pattern covariance matrix indicated by a plurality of pattern vectors to adjust amplitudes of diagonal elements of the pattern covariance matrix after the pattern covariance matrix is transformed by the both-diagonalizing matrix H to be diagonalized, from the diagonal matrices Ds and Dp produced in the diagonal matrix producing means 55; and a feature extraction matrix calculating means 57 for calculating a feature extraction matrix F=LH from the both-diagonalizing matrix H calculated in the both-diagonalizing matrix calculating means 54 and the amplitude re-transformation matrix L calculated in the amplitude re-transformation matrix calculating means 56.

In the above configuration, an operation performed in the pattern recognizing apparatus 11 is described according to a first embodiment.

In this embodiment and following embodiments, the teaching identification face images of the teaching persons are obtained according to a first image pattern obtaining process using the scanner 13, the teaching video face images of the teaching persons are obtained according to a second image pattern obtaining process using the video camera 12, and the referential face image pattern independent of a statistic property difference between the first image pattern obtaining process and the second image pattern obtaining process is produced from the teaching video face images and the teaching identification face images.

In the pattern recognizing apparatus 11, the calculation of a feature extraction matrix F and the calculation of referential face image patterns using the feature extraction matrix F are initially performed as an off-line processing, and the judgement whether or not an input face image of a specific person is identical with one referential face image of one registered person and the selection of the referential face image most similar to the input face image are performed as an in-line processing.

Figure 4:
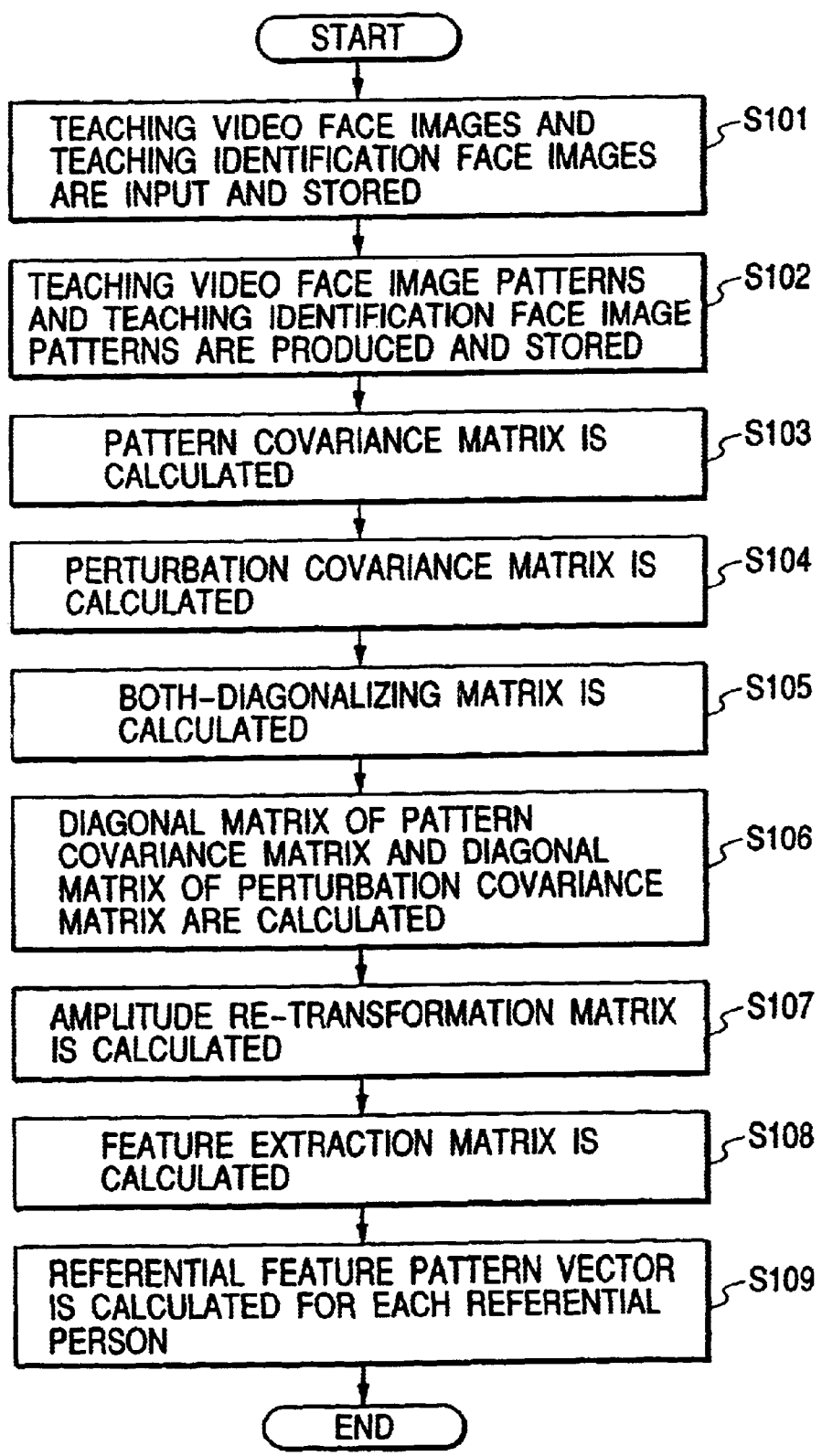
FIG. 4 shows an operation flow in an off-line processing initially performed in the pattern recognizing apparatus according to the first embodiment.

FIG. 4 shows an operation flow in an off-line processing initially performed in the pattern recognizing apparatus 11.

As shown in FIG. 4, a face of a teaching person is directly photographed by the video camera 12 in a teaching image pattern obtaining process, so that an analog signal indicating a video face image of the teaching person is obtained. The analog signal is converted into a digital signal, and the digital signal is stored in the video face image memory 21 as a teaching video face image (step S101). Also, a face photograph of an identification card of the same teaching person is scanned by the image scanner 13 in the teaching image pattern obtaining process, so that an analog signal indicating an identification face image of the teaching person is obtained. The analog signal is converted into a digital signal, and the digital signal is stored in the identification face image memory 23 as a teaching identification face image (step S101).

The teaching video face image and the teaching identification face image are stored for each of a large number of teaching persons. The number of teaching persons is, for example, 15000 to obtain a sufficient number of teaching face images required for the learning of a feature extraction matrix F. Therefore, a plurality of teaching video face images of 1500 teaching persons are stored in the video face image memory 21 as a set of teaching video face images, and a plurality of teaching identification face images of the 1500 teaching persons are stored in the identification face image memory 23 as a set of teaching identification face images.

Thereafter, each teaching video face image is transformed into a teaching video face image pattern expressed by a one-dimensional data string in the feature extraction calculating means 41 of the CPU 25, and the teaching video face image patterns are stored in the video face image pattern memory 26 (step S102). Also, each teaching identification face image is transformed into a teaching identification face image pattern expressed by a one-dimensional data string in the feature extraction calculating means 41, and the teaching identification face image patterns are stored in the dentification face image pattern memory 27 (step S102).

Thereafter, a feature extraction matrix F is calculated in the feature extraction calculating means 41 in steps S103 to S108. In detail, a pattern covariance matrix Cs in a pattern sample space is calculated in the pattern covariance assuming means 51 by using a set of the teaching video face image patterns stored in the video face image pattern memory 26 and/or a set of the teaching identification face image patterns stored in the identification face image pattern memory 27 (step S103). The pattern covariance matrix Cs indicates statistics of a pattern distribution of a set of video face image patterns and/or a set of identification face image patterns in the pattern sample space. For example, in cases where a pattern covariance matrix Cs in a pattern sample space is calculated by using a set of the teaching identification face image patterns, the pattern covariance matrix Cs is expressed according to a following equation.

$$Cs = (1/N)\sum_{i=1}^{N} (bi-m)(bi-m)^T \quad (2)$$

where bi denotes an identification pattern vector (one-dimensional data string) indicating the teaching identification face image pattern of the i-th teaching person, N denotes a number of samples corresponding to the teaching persons (N=15000), $(bi-m)^T$ denotes a transposed matrix of (bi−m), and m denotes an average pattern vector expressed by a following equation $$m = (1/N)\sum_{i=1}^{N} bi.$$

Also, in cases where a pattern covariance matrix Cs in a pattern sample space is calculated by using a set of the teaching video face image patterns and a set of the teaching identification face image patterns, the pattern covariance matrix Cs is expressed according to a following equation.

$$Cs = (1/2N)\sum_{i=1}^{N} \{(ai-m)(ai-m)^T + (bi-m)(bi-m)^T\} \quad (3)$$

where ai denotes a video pattern vector (one-dimensional data string) indicating the teaching video face image patterns of the i-th teaching person, and m denotes an average pattern vector expressed by a following equation.

$$m = (1/2N)\sum_{i=1}^{N} (ai+bi)$$

Thereafter, a pattern perturbation Pi denoting a statistic property difference between the teaching video face image pattern and the teaching identification face image pattern in the i-th teaching person is calculated in the pattern perturbation calculating means 52 according to a following equation.

$$Pi=ai-bi \quad (4)$$

The pattern perturbation Pi occurs according to a statistic property difference between the first image pattern obtaining process using the image scanner 13 and the second image pattern obtaining process using the video camera 12. Thereafter, a perturbation covariance matrix Cp indicating a distribution of a perturbation between a set of the teaching video face image patterns and a set of the teaching identification face image patterns is calculated in the perturbation covariance assuming means 53 by using the pattern perturbation Pi (step S104).

$$Cp = (1/M)\sum_{i=1}^{M} PiPi^T \quad (5)$$

where M denotes a number of perturbation samples. The perturbation covariance matrix Cp is expressed by a covariance of the pattern perturbations Pi and indicates statistics of the change in a pattern distribution of a set of the teaching video face image patterns from a pattern distribution of a set of the teaching identification face image patterns.

Thereafter, an affine transformation matrix H, which diagonalizes both the pattern covariance matrix Cs and the perturbation covariance matrix Cp, is calculated as a both-diagonalizing matrix in the both-diagonalizing matrix calculating means 54 by using the pattern covariance matrix Cs and the perturbation covariance matrix Cp according to a following equation (step S105).

$$H=\Psi^T \Lambda^{-\frac{1}{2}} \Phi^T \quad (6)$$

where $\Phi$ denotes an eigenvector matrix of the matrix Cs, $\Lambda$ denotes an eigenvalue matrix of the matrix Cs, $\Psi$ denotes an eigenvector matrix of a matrix K defined in an equation $$K=(\Lambda^{-\frac{1}{2}}\Phi^T)Cp(\Lambda^{-\frac{1}{2}}\Phi^T)^T,$$

and $\Lambda^{-\frac{1}{2}}=\text{diag}[\sigma_1^{-\frac{1}{2}}, \sigma_2^{-\frac{1}{2}}, \text{- - -}]$ is satisfied for the diagonal matrix $\Lambda=\text{diag}[\sigma_1, \sigma_2, \text{- - -}]$.

Thereafter, a diagonal matrix Ds of the pattern covariance matrix Cs and a diagonal matrix Dp of the perturbation covariance matrix Cp are calculated in the diagonal matrix producing means 55 by diagonalizing the pattern covariance matrix Cs and the perturbation covariance matrix Cp according to the both-diagonalizing matrix H (step S106).

$$Ds=HCsH^T$$

$$Dp=HCpH^T \quad (7)$$

where Ds is expressed by $Ds=\text{diag}[\lambda_1^{(s)}, \lambda_2^{(s)}, \lambda_3^{(s)}, \text{- - -}]$, and Dp is expressed by $Dp=\text{diag}[\lambda_1^{(p)}, \lambda_2^{(p)}, \lambda_3^{(p)}, \text{- - -}]$.

Thereafter, an amplitude re-transformation matrix L, which again transforms a pattern covariance matrix indicated by a plurality of pattern vectors to adjust amplitudes of diagonal elements of the pattern covariance matrix after the pattern covariance matrix is transformed by the both-diagonalizing matrix H to be diagonalized, is calculated from the covariance diagonal matrices Ds and Dp in the amplitude re-transformation matrix calculating means 56 (step S107).

$$L = \mathrm{diag}[(\lambda_1^{(s)n} + \lambda_1^{(p)n})^{-\frac{1}{2n}}, (\lambda_2^{(s)n} + \lambda_2^{(p)n})^{-\frac{1}{2n}}, ---] \quad (8)$$

where n denotes an arbitral real number. In this case, it is applicable that the amplitude re-transformation matrix L be calculated according to a following equation (n=1).

$$L = \mathrm{diag}[(\lambda_1^{(s)} + \lambda_1^{(p)})^{-\frac{1}{2}}, (\lambda_2^{(s)} + \lambda_2^{(p)})^{-\frac{1}{2}}, ---] \quad (9)$$

Finally, a feature extraction matrix F is calculated from the both-diagonalizing matrix H calculated in the both-diagonalizing matrix calculating means 54 and the amplitude re-transformation matrix L in the feature extraction matrix calculating means 57 as a matrix product of L and H (step S108), and the matrix F is stored in the feature extraction matrix memory 29. The feature extraction matrix F is expressed according to a following equation.

$$F = LH \quad (10)$$

Thereafter, referential face image patterns are calculated in the referential face image pattern determining means 42 in a referential image pattern obtaining process of the off-line processing.

In detail, a face photograph of an identification card of each of a plurality of referential persons registered as members in the auxiliary storing unit 16 is scanned by the image scanner 13, and a referential identification face image is stored in the identification face image memory 23 for each referential person. Thereafter, each referential identification face image is expressed by a one-dimensional data string bi (i=1,2, - - - , k) as a referential identification face image pattern, and a referential feature pattern vector fbi independent of a statistic property difference between the first image pattern obtaining process using the image scanner 13 and the second image pattern obtaining process using the video camera 12 is calculated by performing a feature extraction transformation using the feature extraction matrix F for the referential identification face image pattern bi (step S109).

$$fbi = Fbi \quad (11)$$

The referential feature pattern vector fbi is stored in the referential face image data base 30 as a referential face image pattern for each referential person.

The reason that the referential feature pattern vector fbi is independent of a statistic property difference between the first image pattern obtaining process using the image scanner 13 and the second image pattern obtaining process using the video camera 12 is described.

Because the feature extraction matrix F in the equation (11) is a product LH of the both-diagonalizing matrix H and the amplitude re-transformation matrix L, the pattern covariance matrix Cs derived from the referential identification face image patterns bi (or the referential video face image patterns ai) and the perturbation covariance matrix Cp derived from the referential identification face image patterns bi and the referential video face image patterns ai have the same group of eigenvectors by diagonalizing the pattern covariance matrix Cs and the perturbation covariance matrix Cp by using the both-diagonalizing matrix H of the feature extraction matrix F. In addition, the diagonal elements of the pattern covariance matrix Cs and the diagonal elements of the perturbation covariance matrix Cp are adjusted by using the amplitude re-transformation matrix L, so that not only the pattern covariance matrix Cs and the perturbation covariance matrix Cp have the same group of eigenvectors, but also the order of the eigenvectors arranged in the order of decreasing eigenvalues (or variance values) in the pattern covariance matrix Cs can be set to the reverse of the order of the eigenvectors arranged in the order of decreasing eigenvalues (or variance values) in the perturbation covariance matrix Cp. That is, in cases where the eigenvalues $x_1$, $x_2$, - - - , $x_n$ of the pattern covariance matrix Cs are arranged in the decreasing order $x_1 > x_2 > x_3 > $ - - - $> x_n$, the eigenvalues $y_1$, $y_2$, - - - , $y_n$ of the corresponding eigenvectors in the perturbation covariance matrix Cp are arranged in the decreasing order $y_n > y_{n-1} >$ - - - $> y_2 > y_1$. Each eigenvalue in the covariance matrix indicates a variance (that is, the spreading degree of a distribution) in a direction of the corresponding eigenvector.

Figure 5:
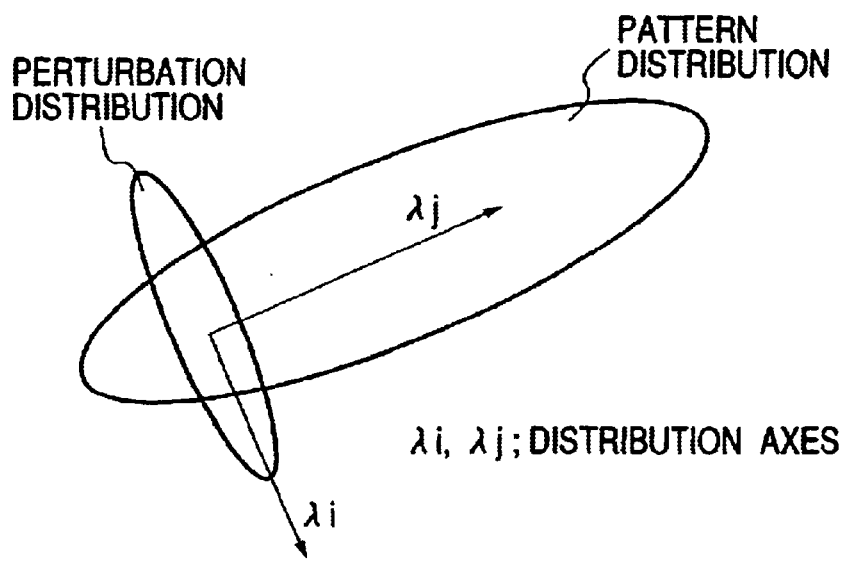
FIG. 5 schematically shows a condition that a pattern distribution is orthogonal to a perturbation distribution.

Therefore, in cases where a feature extraction transformation using the feature extraction matrix F is performed for the pattern covariance matrix Cs indicating a pattern distribution of the face image patterns and the perturbation covariance matrix Cp indicating a perturbation distribution between a set of video face image patterns and a set of identification face image patterns, a pattern sample space occupied by the pattern distribution has the same group of distribution axes (or the same group of basic vectors) as those of a pattern sample space occupied by the perturbation distribution, and the order of the spreading degrees of the pattern distribution in directions of the axes is the reverse of the order of the spreading degrees of the perturbation distribution in directions of the axes. As shown in FIG. 5, this reverse relationship in the spreading degrees between the pattern distribution and the perturbation distribution indicates a condition that the pattern distribution is orthogonal to the perturbation distribution, and an overlapping area between the pattern distribution and the perturbation distribution is minimized. The minimization of the overlapping area indicates that perturbation components coming in the pattern sample space of the face image patterns are effectively removed. Because the perturbation components denote a statistic property difference between a group of image patterns obtained in a first process using the image scanner 13 and a group of image patterns obtained in a second process using the video camera 12, a pattern recognition independent of a statistic property difference between the first image pattern obtaining process using the image scanner 13 and the second image pattern obtaining process using the video camera 12 can be performed in cases where a feature extraction transformation using the feature extraction matrix F is performed for the image patterns.

Thereafter, in an in-line processing, the judgement whether or not an input face image of a specific person is identical with one referential face image of one referential person is performed for each registered person, and one or more referential face images most similar to the input face image are selected in the optimum match processing performing means 43.

Figure 6:
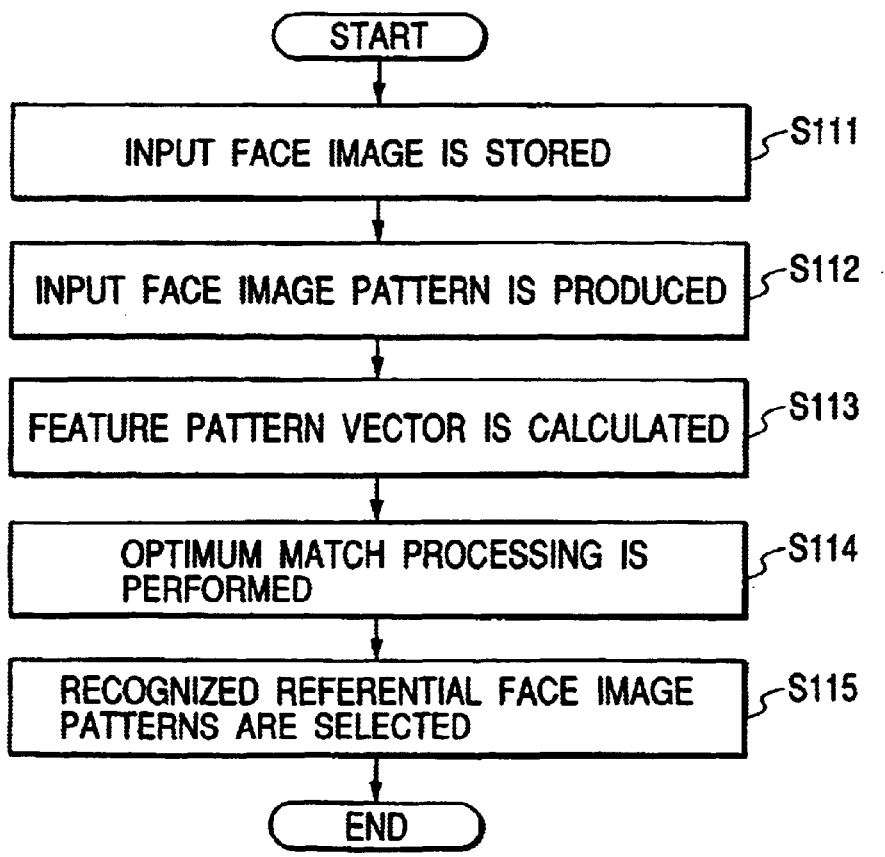
FIG. 6 shows an operation flow in an on-line processing performed in the pattern recognizing apparatus according to the first embodiment.

FIG. 6 shows an operation flow in an on-line processing performed in the pattern recognizing apparatus 11.

As shown in FIG. 6, a face of a specific person is directly photographed by using the video camera 12 to obtain an input face image, the input face image of the specific person is stored in,the video face image memory 21 (step S111). Thereafter, the input face image is converted into an input face image pattern $a_2$ expressed by a one-dimensional data string in the CPU 25, and the input face image pattern $a_2$ is stored in the video face image pattern memory 26 (step S112). Thereafter, an input feature pattern vector $fa_2$ independent of a statistic property difference between the first image pattern obtaining process using the image scanner 13 and the second image pattern obtaining process using the video camera 12 is calculated by performing a feature extraction transformation using the feature extraction matrix F for the input face image pattern $a_2$ (step S113).

$$fa_2 = Fa_2 \qquad (12)$$

Thereafter, the judgement whether or not the input feature pattern vector $fa_2$ is identical with one referential face image pattern is performed for each referential face image pattern stored in the referential face image data base 30, and one or more referential face image patterns most similar to the input feature pattern vector $fa_2$ are selected as one or more recognized referential face image patterns according to an optimum match processing (step S114). Thereafter, one or more recognized face images indicated by the recognized referential face image patterns are displayed on the display 17 as one or more candidates for the specific person, or the recognized referential face image patterns are output to the output terminal 18 (step S115).

In this embodiment, a set of referential face image patterns is determined from a set of referential identification face images obtained by using the image scanner 13. However, because a feature extraction transformation using the feature extraction matrix F is performed for a set of face image patterns to obtain the set of referential face image patterns, even though a set of referential video face images are obtained by using the video camera 12, a set of referential face image patterns can be determined from the set of referential video face images.

Also, in this embodiment, the input face image of the specific person is obtained by using the video camera 12. However, because a feature extraction transformation using the feature extraction matrix F is performed for the input face image pattern, even though the input face image of the specific person is obtained by using the image scanner 13, the input feature pattern vector $fa_2$ independent of a statistic property difference between the first image pattern obtaining process and the second image pattern obtaining process can be obtained.

Accordingly, because the feature extraction matrix F, which minimizes an overlapping area between the pattern distribution of a set of face image patterns and the perturbation distribution of the set of face image patterns, is assumed in advance by using a set of video face images and a set of identification face images, a plurality of referential face image patterns independent of a statistic property difference between the first image pattern obtaining process using the image scanner 13 and the second image pattern obtaining process using the video camera 12 can be obtained, and one or more referential face image patterns most similar to a face image pattern corresponding to a specific person can be selected regardless of whether the face image pattern is obtained according to the first image pattern obtaining process or the second image pattern obtaining process.

In this embodiment, the video camera 12 and the image scanner 13 are used as image receiving means. However, the image receiving means is not limited to the video camera 12 and the image scanner 13, and it is applicable that two or more image receiving units be used as the image receiving means.

Also, the set of referential face image patterns is obtained in the off-line processing. However, it is applicable that a set of referential face image patterns obtained in an external apparatus be stored in advance in the auxiliary storing unit 16.

Also, the set of referential face image patterns obtained in the off-line processing is stored in the referential face image data base 30. However, it is applicable that the set of referential face image patterns be stored in advance in the auxiliary storing unit 16.

Also, in this embodiment, a face image pattern is recognized in the pattern recognizing apparatus 11. However, it is applicable that an image pattern of a mobil car, parts or the like be recognized in the pattern recognizing apparatus 11. Also, it is applicable that patterned data obtained from audio data, character data or the like be recognized in the pattern recognizing apparatus 11.

Second Embodiment

In a second embodiment, the judgement whether or not a specific person is identical with a photograph person corresponding to an identification card exhibited by the specific person is performed in a pattern identity judging apparatus according to a pattern identity judging method by collating a video face image pattern obtained by directly photographing a face of the specific person with a photograph face image pattern obtained by scanning a face photograph of the identification card. A hardware of the pattern identity judging apparatus is the same as that of the pattern recognizing apparatus 11 shown in FIG. 1.

Figure 7:
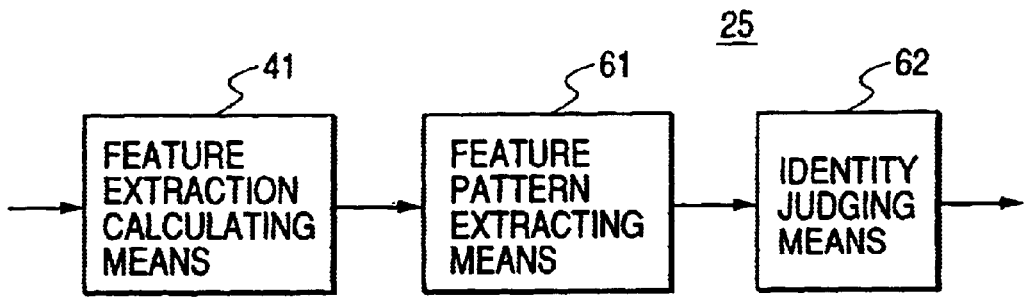
FIG. 7 is a block diagram showing a functional structure of the CPU arranged in the pattern identity judging apparatus according to a second embodiment of the present invention.

FIG. 7 is a block diagram showing a functional structure of the CPU 25 arranged in the pattern identity judging apparatus 11 according to a second embodiment of the present invention.

As shown in FIG. 7, the CPU 25 comprises the feature extraction calculating means 41;

a feature pattern extracting means 61 for performing a feature extraction transformation using the feature extraction matrix F for a first input face image pattern $a_{in}$ of a first input face image, which is obtained by directly photographing a face of a specific person with the video camera 12, to produce a first input feature pattern vector $fa_{in}$, and performing a feature extraction transformation using the feature extraction matrix F for a second input face image pattern $b_{in}$ of a second input face image, which is obtained by scanning a face photograph of a photograph person attached to an identification card with the image scanner 13, to produce a second input feature pattern vector $fb_{in}$; and an identity judging means 62 for collating the first input feature pattern vector $fa_{in}$ with the second input feature pattern vector $fb_{in}$ to estimate a similarity between the first input feature pattern vector $fa_{in}$ and the second input feature pattern vector $fb_{in}$ and judging according to the similarity whether or not the specific person corresponding to the first input feature pattern vector $fa_{in}$ is identical with the photograph person of the face photograph corresponding to the second input feature pattern vector $fb_{in}$.

In the above configuration, an operation performed in the pattern identity judging apparatus 11 is described.

Figure 8:
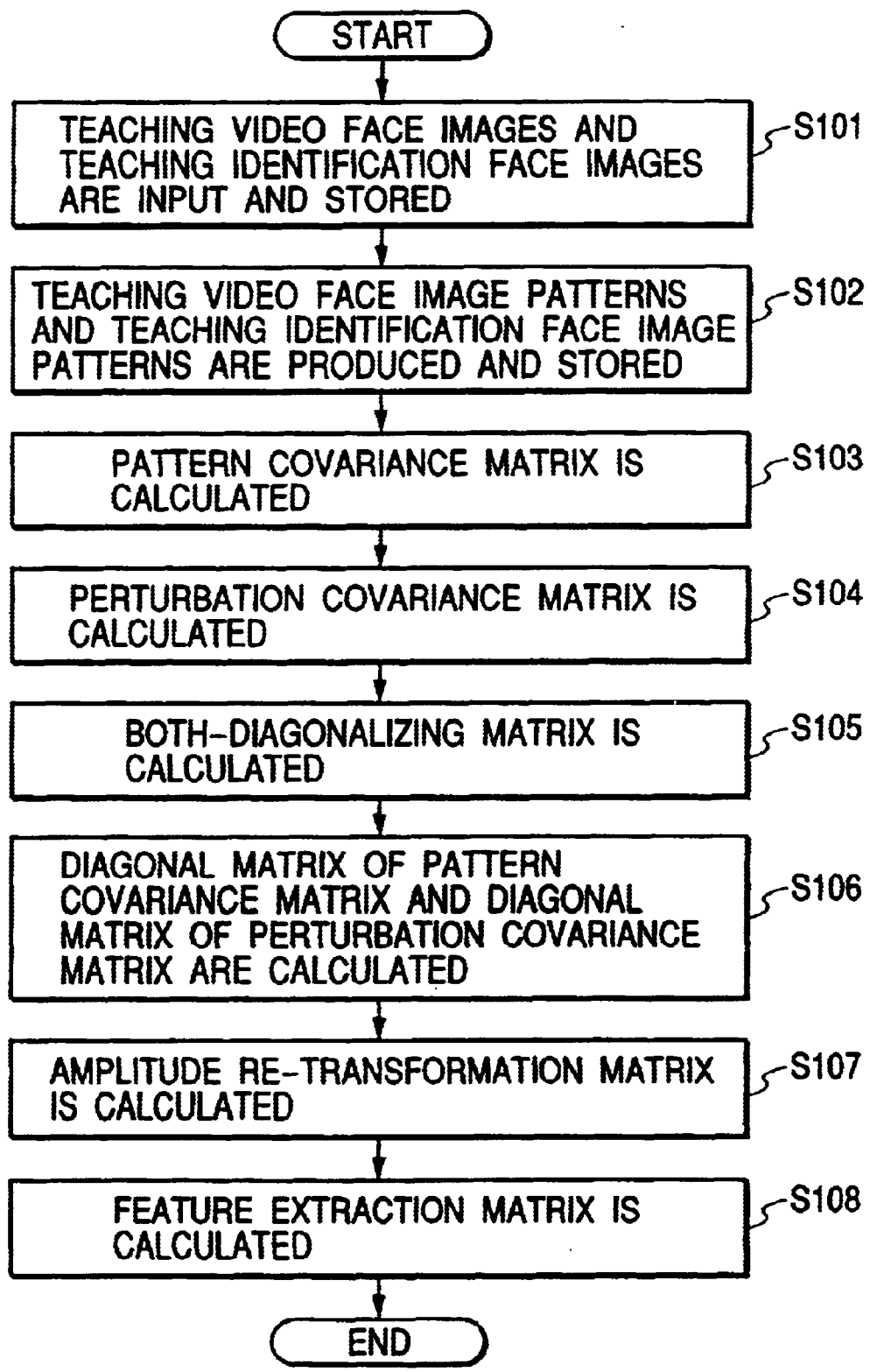
FIG. 8 shows an operation flow in an off-line processing initially performed in a feature extraction calculating means arranged in the CPU of the pattern identity judging apparatus according to the second embodiment.

FIG. 8 shows an operation flow in an off-line processing initially performed in the feature extraction calculating means 41 of the pattern identity judging apparatus 11.

As shown in FIG. 8, the feature extraction matrix F is calculated in the steps S101 to S108 in the same manner as in the first embodiment.

Thereafter, when a specific person exhibits an identification card, the judgement whether or not the specific person directly photographed with the video camera 12 is identical with a photograph person of a face photograph attached to the identification card is performed in an on-line processing by collating a face image of the specific person with a face image of the face photograph of the photograph person.

Figure 9:
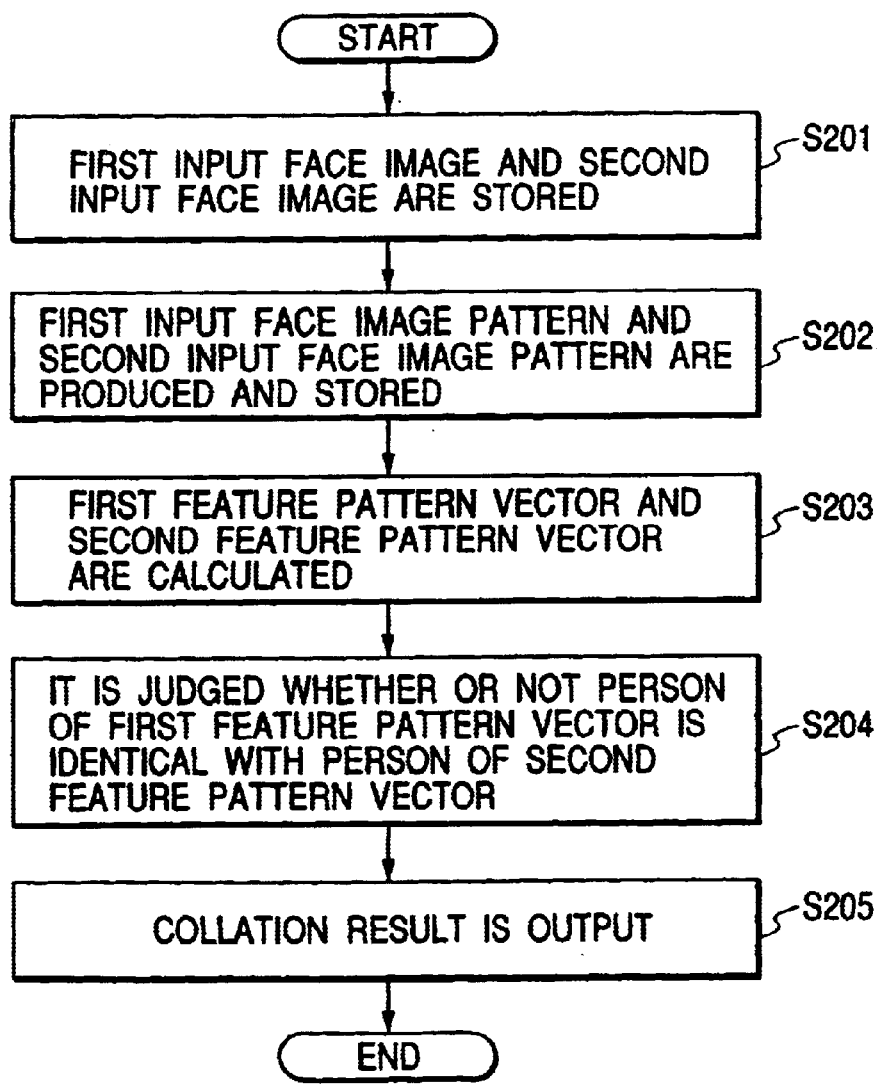
FIG. 9 shows an operation flow in an on-line processing performed in a feature pattern extracting means and an identity judging means arranged in the CPU of the pattern identity judging apparatus according to the second embodiment.

FIG. 9 shows an operation flow in an on-line processing performed in the feature pattern extracting means 61 and the identity judging means 62.

As shown in FIG. 9, when a specific person exhibits an identification card, a face of the specific person is directly photographed with the video camera 12 to obtain a first input face image, and the first input face image of the specific person is stored in the video face image memory 21 (step S201). Also, a face photograph of the identification card is scanned by the image scanner 13 to obtain a second input face image, and the second input face image of the face photograph is stored in the identification face image memory 23 (step S201).

Thereafter, the first input face image is converted into a first input face image pattern $a_{in}$ expressed by a one-dimensional data string, and the first input face image pattern $a_{in}$ is stored in the video face image pattern memory 26 (step S202). Also, the second input face image is converted into a second input face image pattern $b_{in}$ expressed by a one-dimensional data string, and the second input face image pattern $b_{in}$ is stored in the identification face image pattern memory 27 (step S202).

Thereafter, a first input feature pattern vector $fa_{in}$ independent of a statistic property difference between the first image pattern obtaining process using the image scanner 13 and the second image pattern obtaining process using the video camera 12 is calculated in the feature pattern extracting means 61 by performing a feature extraction transformation using the feature extraction matrix F for the first input face image pattern $a_{in}$ (step S203).

$$fa_{in} = F a_{in} \quad (13)$$

Also, a second input feature pattern vector $fb_{in}$ independent of a statistic property difference between the first image pattern obtaining process using the image scanner 13 and the second image pattern obtaining process using the video camera 12 is calculated in the feature pattern extracting means 61 by performing a feature extraction transformation using the feature extraction matrix F for the second input face image pattern $b_{in}$ (step S203).

$$fb_{in} = F b_{in} \quad (14)$$

Thereafter, the first input feature pattern vector $fa_{in}$ is collated with the second input feature pattern vector $fb_{in}$ in the identity judging means 62 to estimate a similarity between the first input feature pattern vector $fa_{in}$ and the second input feature pattern vector $fb_{in}$, and it is judged according to the similarity whether or not the specific person corresponding to the first input feature pattern vector $fa_{in}$ is identical with the photograph person of the face photograph corresponding to the second input feature pattern vector $fb_{in}$ (step S204). In cases where the similarity is sufficiently high, it is judged that the specific person is identical with the photograph person of the face photograph, and a collation result indicating that the specific person is identical with the photograph person of the face photograph is displayed on the display 16 or is output to the output terminal 18 (step S205). In contrast, in cases where the similarity is not sufficiently high, it is judged that the specific person is not identical with the photograph person of the face photograph, and a collation result indicating that the specific person is not identical with the photograph person of the face photograph is displayed on the display 16 or is output to the output terminal 18 (step S205).

Accordingly, because the first input feature pattern vector $fa_{in}$ independent of a statistic property difference between the first image pattern obtaining process and the second image pattern obtaining process and the second input feature pattern vector $fb_{in}$ independent of the statistic property difference are obtained by performing a feature extraction transformation using the feature extraction matrix F for the first input face image pattern $a_{in}$ and the second input face image pattern $b_{in}$, and because the first input feature pattern vector $fa_{in}$ is collated with the second input feature pattern vector $fb_{in}$, even though the processes for obtaining the two face images differ from each other, the judgement whether or not the specific person of the photographed face image corresponding to the video camera 12 is identical with the photograph person of the face photograph corresponding to the image scanner 13 can be correctly performed. That is, in cases where the specific person is actually identical with the photograph person of the face photograph, a collation result indicating that the specific person is identical with the photograph person of the face photograph can be reliably obtained.

In this embodiment, the video camera 12 and the image scanner 13 are used as image receiving means. However, the image receiving means is not limited to the video camera 12 and the image scanner 13, and it is applicable that two or more image receiving units be used as the image receiving means.

Also, the set of teaching face image patterns is obtained in the off-line processing. However, it is applicable that a set of teaching face image patterns obtained in an external apparatus be stored in advance in the auxiliary storing unit 16.

Also, the set of teaching face image patterns obtained in the off-line processing is stored in the referential face image data base 30. However, it is applicable that the set of teaching face image patterns be stored in advance in the auxiliary storing unit 16.

Also, in this embodiment, two face image patterns are collated with each other in the pattern identity judging apparatus 11. However, it is applicable that image patterns of a mobil car, parts or the like be collated with each other in the pattern identity judging apparatus 11. Also, it is applicable that patterned data obtained from audio data, character data or the like be collated with each other in the pattern identity judging apparatus 11.

Third Embodiment

In this embodiment, a feature extraction matrix is produced for each registered person, a referential face image pattern, for which a feature extraction using the corresponding feature extraction matrix is performed, is produced for each registered person, and a specific person, of which an input face image pattern is most similar to a specific referential face image pattern of a specific registered person selected from the registered persons, is recognized as the specific registered person by using the pattern recognizing apparatus shown in FIG. 1.

Figure 10:
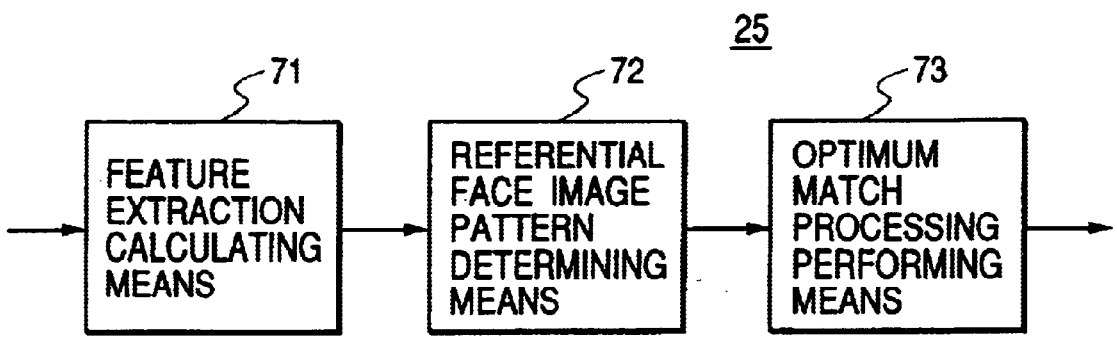
FIG. 10 is a block diagram showing a functional structure of the CPU 25 according to a third embodiment of the present invention.

FIG. 10 is a block diagram showing a functional structure of the CPU 25 according to a third embodiment of the present invention.

As shown in FIG. 10, the CPU 25 comprises
 a feature extraction calculating means 71 for calculating
  a feature extraction matrix Fi from a plurality of teaching video face images of a plurality of registered persons and a plurality of teaching identification face images of the registered persons;

a referential face image pattern determining means 72 for determining a referential face image pattern from a referential face image of one registered person according to the feature extraction matrix Fi of the registered person calculated in the feature extraction calculating means 71 for each of the registered persons; and an optimum match processing performing means 73 for performing an optimum match processing to judge whether or not an input face image pattern of a specific person is identical with the referential face image pattern of each registered person and recognizing the specific person as a specific registered person selected from the registered persons on condition that the input face image pattern of the specific person is most similar to a specific referential face image pattern of the specific registered person.

Figure 11:
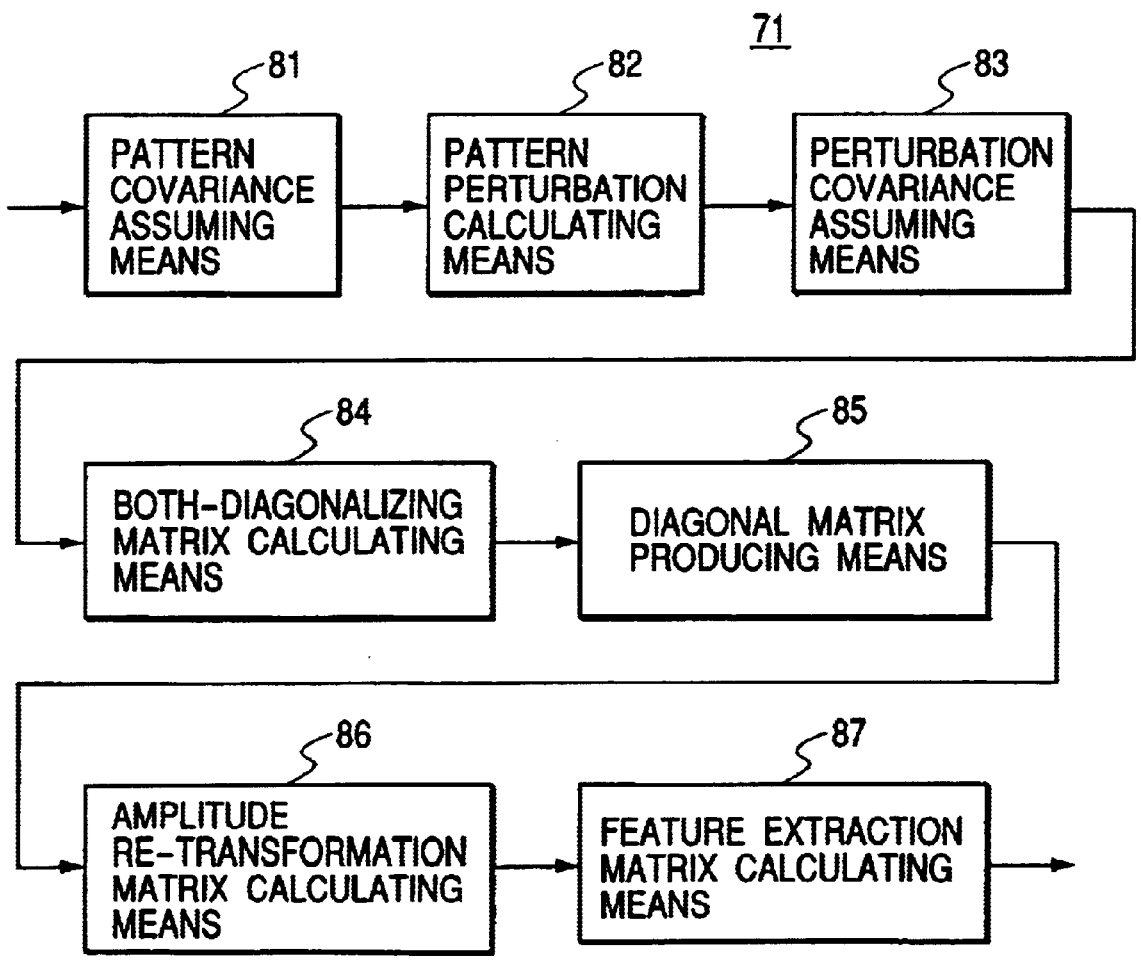
FIG. 11 is a block diagram of a feature extraction matrix calculating means arranged in the CPU according to the third embodiment.

FIG. 11 is a block diagram of the feature extraction matrix calculating means 71.

As shown in FIG. 11, the feature extraction calculating means 71 comprises a pattern covariance assuming means 81 for assuming a pattern covariance matrix Cs of a pattern sample space from a set of the teaching video face image patterns and/or a set of the teaching identification face image patterns;

a pattern perturbation calculating means 82 for calculating a pattern perturbation Pji denoting a statistic property difference between one teaching video face image pattern aji and one teaching identification face image pattern bi corresponding to one registered person for each registered person;

a perturbation covariance assuming means 83 for assuming a covariance matrix Cp(i) of the pattern perturbations Pji (j=1 to L) calculated in the pattern perturbation calculating means 82 for each registered person;

a both-diagonalizing matrix calculating means 84 for calculating a both-diagonalizing matrix Hi, which diagonalizes both the pattern covariance matrix Cs and the perturbation covariance matrix Cp(i), from the pattern covariance matrix Cs assumed in the pattern covariance assuming means 81 and the perturbation covariance matrix Cp(i) assumed in the perturbation covariance assuming means 82;

a diagonal matrix producing means 85 for diagonalizing the pattern covariance matrix Cs according to the both-diagonalizing matrix Hi calculated in the both-diagonalizing matrix calculating means 84 to produce a diagonal matrix Ds(i) of the pattern covariance matrix Cs for each registered person and diagonalizing the perturbation covariance matrix Cp(i) according to the both-diagonalizing matrix Hi to produce a diagonal matrix Dp(i) of the perturbation covariance matrix Cp(i) for each registered person;

an amplitude re-transformation matrix calculating means 86 for calculating an amplitude re-transformation matrix Li, which again transforms a pattern covariance matrix indicated by a plurality of pattern vectors to adjust amplitudes of diagonal elements of the pattern covariance matrix after the pattern covariance matrix is transformed by the both-diagonalizing matrix Hi to be diagonalized, from the diagonal matrices Ds(i) and Dp(i) produced in the diagonal matrix producing means 85 for each registered person; and a feature extraction matrix calculating means 87 for calculating a feature extraction matrix Fi=LiHi from the both-diagonalizing matrix Hi calculated in the both-diagonalizing matrix calculating means 84 and the amplitude re-transformation matrix Li calculated in the amplitude re-transformation matrix calculating means 86 for each registered person.

In the above configuration, an operation performed in the pattern recognizing apparatus 11 is described according to a third embodiment.

In the pattern recognizing apparatus 11, the calculation of feature extraction matrices Fi and the calculation of referential face image patterns using the feature extraction matrices Fi are initially performed as an off-line processing, and the judgement whether or not an input face image of a specific person is identical with one referential face image of one registered person and the recognition of the specific person as a specific registered person are performed as an in-line processing.

Figure 12:
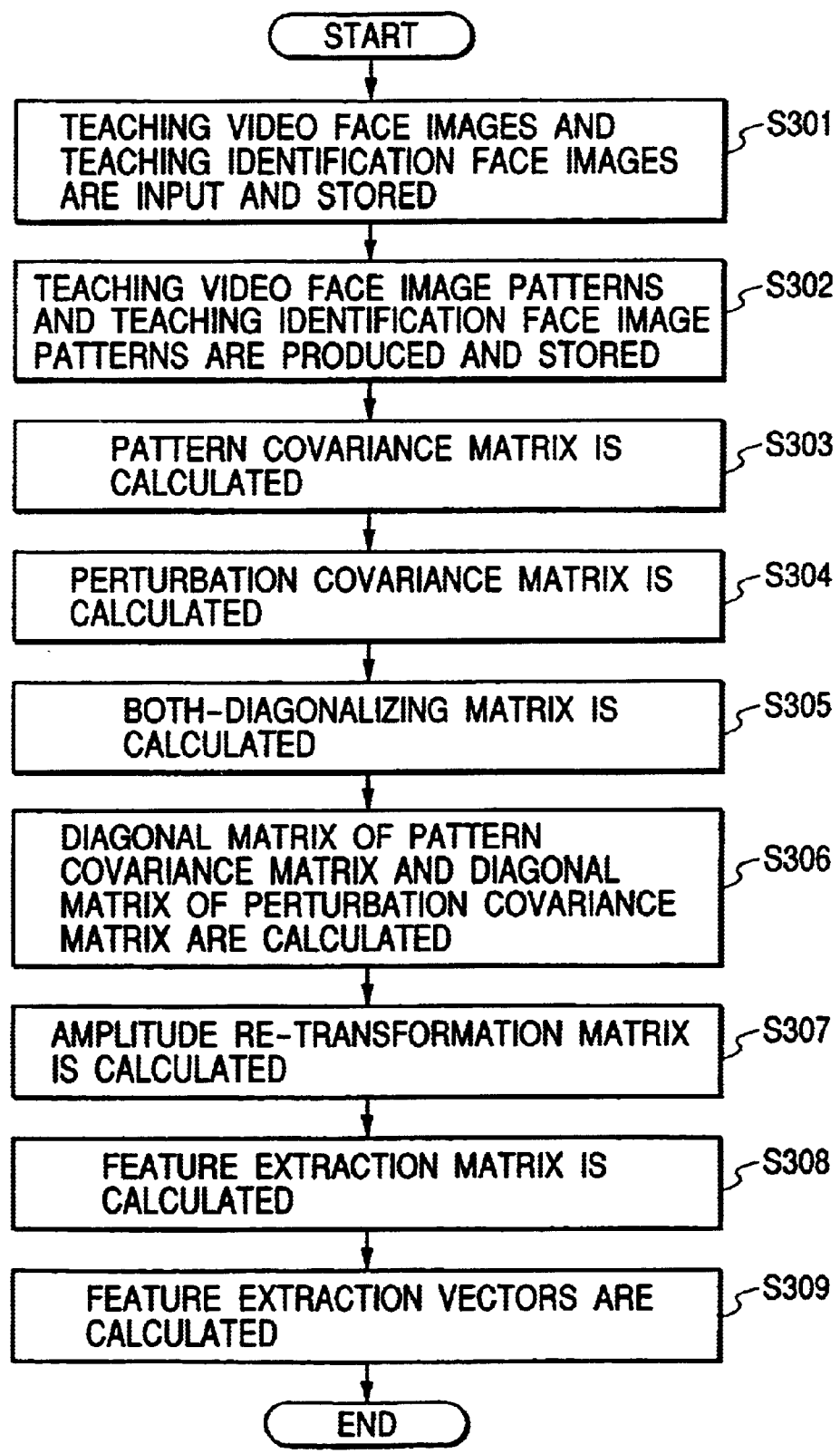
FIG. 12 shows an operation flow in an off-line processing initially performed in the pattern recognizing apparatus according the third embodiment.

FIG. 12 shows an operation flow in an off-line processing initially performed in the pattern recognizing apparatus 11 according to the third embodiment.

As shown in FIG. 12, a face of a registered person is directly photographed by the video camera 12 in a teaching image pattern obtaining process, so that an analog signal indicating a moving picture composed of a series of still pictures is obtained. A face image of the registered person is depicted in each still picture as a video face image. The analog signal is converted into a digital signal, and the digital signal is stored in the video face image memory 21 as a group of teaching video face images (step S301). Also, a face photograph of an identification card of the same registered person is scanned by the image scanner 13 in the teaching image pattern obtaining process, and a teaching identification face image of the registered person is stored in the identification face image memory 23 in the same manner as in the first embodiment (step S301).

The teaching video face image and the teaching identification face image are stored for each of registered persons. The number of registered persons is, for example, 15000 to obtain a sufficient number of teaching face images required for the learning of feature extraction matrices Fi. Therefore, a plurality of groups of teaching video face images of 1500 registered persons are stored in the video face image memory 21 as a set of teaching video face images, and a plurality of teaching identification face images of the 1500 registered persons are stored in the identification face image memory 23 as a set of teaching identification face images.

Thereafter, each teaching video face image is transformed into a teaching video face image pattern aji expressed by a one-dimensional data string in the feature extraction calculating means 71 of the CPU 25, and the teaching video face image patterns aji are stored in the video face image pattern memory 26 (step S302). A subscript "j" of aji corresponds to each still picture of one registered person (j=1 to L), and a subscript "i" of aji corresponds to each registered person (i=1 to N). Also, each teaching identification face image is transformed into a teaching identification face image pattern bi in the same manner as in the first embodiment in the feature extraction calculating means 71, and the teaching identification face image patterns bi are stored in the identification face image pattern memory 27 (step S302).

Thereafter, a feature extraction matrix Fi is calculated for each registered person in the feature extraction calculating means 71 in steps S303 to S308. In detail, a pattern covariance matrix Cs defined in a pattern sample space is calculated in the pattern covariance assuming means 81 by using a set of the teaching video face image patterns aji stored in the video face image pattern memory 26 and/or a set of the teaching identification face image patterns bi stored in the identification face image pattern memory 27 (step S303). For example, in cases where a pattern covariance matrix Cs is calculated by using a set of the teaching identification face image patterns bi, the pattern covariance matrix Cs is expressed in the equation (2) in the same manner as in the first embodiment.

Also, in cases where a pattern covariance matrix Cs is calculated by using a set of the teaching video face image patterns, the pattern covariance matrix Cs is expressed according to a following equation.

$$Cs = (1/N)\sum_{i=1}^{N}(ai-m)(ai-m)^T \qquad (15)$$

where ai denotes an average pattern vector of each registered person expressed by a following equation $$ai = (1/L)\sum_{j=1}^{L} aji,$$

and m denotes an average pattern vector expressed by a following equation $$m = (1/N)\sum_{i=1}^{N} ai.$$

Also, in cases where a pattern covariance matrix Cs in a pattern sample space is calculated by using a set of the teaching video face image patterns and a set of the teaching identification face image patterns, the pattern covariance matrix Cs is expressed in the equation (3) in the same manner as in the first embodiment.

Thereafter, a pattern perturbation Pji denoting a statistic property difference between each teaching video face image pattern aji of the i-th registered person and one teaching identification face image pattern bi of the i-th registered person is calculated in the pattern perturbation calculating means 82 according to a following equation.

$$Pji=aji-bi \qquad (16)$$

Thereafter, a perturbation covariance matrix Cp(i) indicating a distribution of a perturbation between one group of teaching video face image patterns aji and one teaching identification face image pattern bi is calculated for each registered person in the perturbation covariance assuming means 83 by using the pattern perturbations Pji (step S304).

$$Cp(i) = (1/L)\sum_{j=1}^{L} PjiPji^T \qquad (17)$$

Where L denotes the number of still pictures existing in one moving picture. Each perturbation covariance matrix Cp(i) is expressed by a covariance of the pattern perturbations Pji and indicates a statistic difference in a pattern distribution of one registered person between a face image obtained from the video camera 12 and a face image obtained from the image scanner 13.

Thereafter, an affine transformation matrix Hi, which diagonalizes both the pattern covariance matrix Cs and the perturbation covariance matrix Cp(i), is calculated as a both-diagonalizing matrix for each registered person in the both-diagonalizing matrix calculating means 84 by using the pattern covariance matrix Cs and the perturbation covariance matrix Cp(i) according to a following equation (step S305).

$$Hi=\Psi^T\Lambda^{-\frac{1}{2}}\Phi^T \qquad (18)$$

where $\Psi$ denotes an eigenvector matrix of a matrix Ki defined in an equation $$Ki=(\Lambda^{-\frac{1}{2}}\Phi^T)Cp(i)(\Lambda^{-\frac{1}{2}}\Phi^T)^T.$$

Thereafter, a diagonal matrix Ds(i) of the pattern covariance matrix Cs and a diagonal matrix Dp(i) of the perturbation covariance matrix Cp(i) are calculated for each registered person in the diagonal matrix producing means 85 by diagonalizing the pattern covariance matrix Cs and the perturbation covariance matrix Cp(i) according to the both-diagonalizing matrix Hi (step S306).

$$Ds(i)=HiCsHi^T$$

$$Dp(i)=HiCp(i)Hi^T \qquad (19)$$

where Ds(i) is expressed by $Ds(i)=\text{diag}[\lambda_{t1}^{(s)}, \lambda_{t2}^{(s)}, \lambda_{t3}^{(s)}, ---]$, and Dp(i) is expressed by $Dp(i)=\text{diag}[\lambda_{t1}^{(p)}, \lambda_{t2}^{(p)}, \lambda_{t3}^{(p)}, ---]$.

Thereafter, an amplitude re-transformation matrix Li, which again transforms a pattern covariance matrix indicated by a plurality of pattern vectors to adjust amplitudes of diagonal elements of the pattern covariance matrix after the pattern covariance matrix is transformed by the both-diagonalizing matrix Hi to be diagonalized, is calculated from the covariance diagonal matrices Ds(i) and Dp(i) for each registered person in the amplitude re-transformation matrix calculating means 86 (step S307).

$$Li=\text{diag}[(\lambda_{t1}^{(s)n}+\lambda_{t1}^{(p)n})^{-\frac{1}{2n}}, (\lambda_{t2}^{(s)n}+\lambda_{t2}^{(p)n})^{-\frac{1}{2n}}, ---] \qquad (20)$$

where n denotes an arbitral real number. In this case, it is applicable that the amplitude re-transformation matrix Li be calculated according to a following equation (n=1).

$$Li=\text{diag}[(\lambda_{t1}^{(s)}+\lambda_{t1}^{(p)})^{-\frac{1}{2}}, (\lambda_{t2}^{(s)}+\lambda_{t2}^{(p)})^{-\frac{1}{2}}, ---] \qquad (21)$$

Finally, a feature extraction matrix Fi is calculated from the both-diagonalizing matrix Hi calculated in the both-diagonalizing matrix calculating means 84 and the amplitude re-transformation matrix Li for each registered person in the feature extraction matrix calculating means 87 as a matrix product of Li and Hi (step S308), and the matrices Fi are stored in the feature extraction matrix memory 29. Each feature extraction matrix Fi is expressed according to a following equation.

$$Fi=LiHi \qquad (22)$$

Thereafter, referential face image patterns are calculated in the referential face image pattern determining means 72 in a referential image pattern obtaining process of the off-line processing.

In detail, a face photograph of an identification card of each of the registered persons is scanned by the image scanner 13, and a face image of each registered person is stored as a referential identification face image in the identification face image memory 23 for each registered person. Thereafter, each referential identification face image is expressed by a one-dimensional data string $B_1i$ as a referential identification face image pattern, and a referential feature pattern vector $fB_1i$ independent of a statistic property difference between the first image pattern obtaining process using the image scanner 13 and the second image pattern obtaining process using the video camera 12 is calculated for each registered person by performing a feature extraction transformation using the feature extraction matrix Fi for the referential identification face image pattern $B_1i$ (step S309).

$$fB_1i = FiB_1i \quad (23)$$

Where the feature extraction matrix Fi and the referential identification face image pattern $B_1i$ correspond to the same registered person.

The referential feature pattern vector $fB_1i$ is stored in the referential face image data base 30 as a referential face image pattern for each registered person.

The reason that the referential feature pattern vector $fB_1i$ is independent of a statistic property difference between the first image pattern obtaining process using the image scanner 13 and the second image pattern obtaining process using the video camera 12 is described.

Because the feature extraction matrix Fi in the equation (11) is a product LiHi of the both-diagonalizing matrix Hi and the amplitude re-transformation matrix Li, an i-th registered person component of the pattern covariance matrix Cs derived from the referential identification face image patterns bi (or the referential video face image patterns ai) and the perturbation covariance matrix Cp(i) derived from the referential identification face image pattern bi and the referential video face image pattern ai have the same group of eigenvectors by diagonalizing the i-th registered person component of the pattern covariance matrix Cs and the perturbation covariance matrix Cp(i) by using the both-diagonalizing matrix Hi. In addition, the diagonal elements of the i-th registered person component of the pattern covariance matrix Cs and the diagonal elements of the perturbation covariance matrix Cp(i) are adjusted by using the amplitude re-transformation matrix Li, so that not only the i-th registered person component of the pattern covariance matrix Cs and the perturbation covariance matrix Cp(i) have the same group of eigenvectors, but also the order of the eigenvectors arranged in the order of decreasing eigenvalues (or variance values) in the i-th registered person component of the pattern covariance matrix Cs can be set to the reverse of the order of the eigenvectors arranged in the order of decreasing eigenvalues (or variance values) in the perturbation covariance matrix Cp(i). That is, in cases where the eigenvalues $x_1, x_2, \cdots, x_n$ of the i-th registered person component of the pattern covariance matrix Cs are arranged in the decreasing order $x_1 > x_2 > x_3 > \cdots > x_n$, the eigenvalues $y_1, y_2, \cdots, y_n$ of the corresponding eigenvectors in the perturbation covariance matrix Cp(i) are arranged in the decreasing order $y_n > y_{n-1} > \cdots > y_2 > y_1$. Each eigenvalue in the covariance matrix indicates a variance (that is, the spreading degree of a distribution) in a direction of the corresponding eigenvector.

Therefore, in cases where a feature extraction transformation using the feature extraction matrix Fi is performed for the i-th registered person component of the pattern covariance matrix Cs indicating a pattern distribution of the face image patterns and the perturbation covariance matrix Cp(i) indicating a perturbation distribution between the video face image pattern of the i-th registered person and the identification face image pattern of the i-th registered person, a pattern sample space occupied by the pattern distribution has the same group of distribution axes (or the same group of basic vectors) as those of a pattern sample space occupied by the perturbation distribution, and the order of the spreading degrees of the pattern distribution in directions of the axes is the reverse of the order of the spreading degrees of the perturbation distribution in directions of the axes. This reverse relationship in the spreading degrees between the pattern distribution of the i-th registered person and the perturbation distribution of the i-th registered person indicates a condition that the pattern distribution is orthogonal to the perturbation distribution, and an overlapping area between the pattern distribution of the i-th registered person and the perturbation distribution of the i-th registered person is minimized. The minimization of the overlapping area indicates that perturbation components coming in the pattern sample space of the face image pattern of the i-th registered person are effectively removed. Because the perturbation components denote a statistic property difference between the image pattern of the i-th registered person obtained in a first process using the image scanner 13 and the image pattern of the i-th registered person obtained in a second process using the video camera 12, a pattern recognition independent of a statistic property difference between the first image pattern obtaining process using the image scanner 13 and the second image pattern obtaining process using the video camera 12 can be performed in cases where a feature extraction transformation using the feature extraction matrix Fi is performed for each image pattern.

Thereafter, in an in-line processing, the judgement whether or not an input face image of a specific person is identical with one referential face image of one registered person is performed for each registered person, and one or more referential face images most similar to the input face image are selected in the optimum match processing performing means 73.

Figure 13:
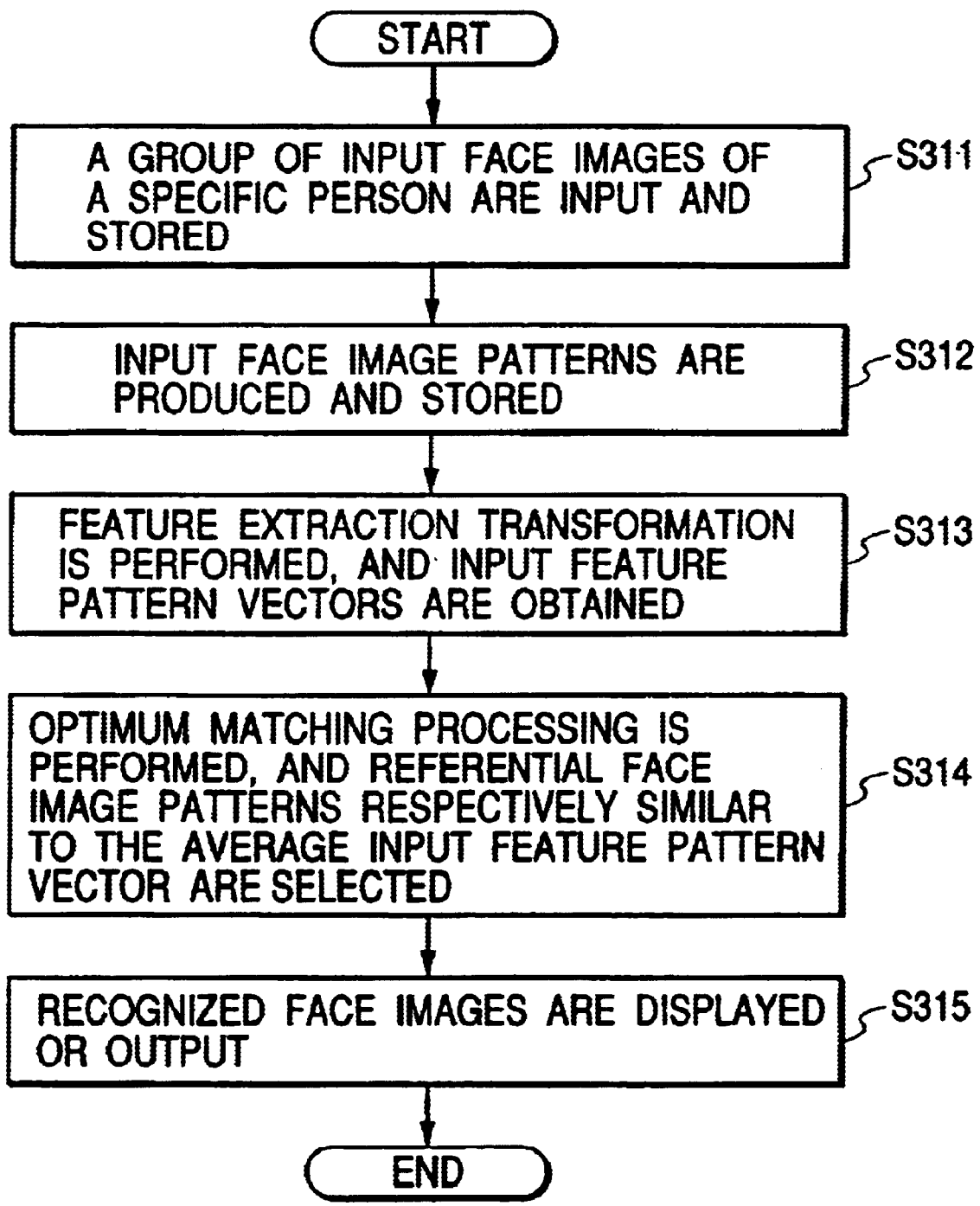
FIG. 13 shows an operation flow in an on-line processing performed in the pattern recognizing apparatus according to the third embodiment.

FIG. 13 shows an operation flow in an on-line processing performed in the pattern recognizing apparatus 11 according to the third embodiment.

As shown in FIG. 13, a face of a specific person is directly photographed by using the video camera 12 to obtain an input moving picture composed of a series of input still pictures of the specific person. A face image of the specific person is depicted in each still picture as an input face image. A group of input face images of the specific person are stored in the video face image memory 21 (step S311). Thereafter, each input face image is converted into an input face image pattern $A_2j$ expressed by a one-dimensional data string in the CPU 25, and the group of input face image patterns $A_2j$ are stored in the video face image pattern memory 26 (step S312). Thereafter, a feature extraction transformation using the feature extraction matrix Fi of one registered person is performed for the input face image pattern $A_2j$ to calculate an input feature pattern vector $fA_2ji$ corresponding to the registered person (step S313) from the input face image pattern $A_2j$.

$$fA_2ji = FiA_2j \quad (24)$$

Where the feature extraction matrix Fi corresponds to the i-th registered person, and the input face image pattern $A_2j$ corresponds to one still picture of the specific person. The input feature pattern vector $fA_2ji$ is calculated for each input face image pattern $A_2j$ (that is, for each still picture of the specific person). Also, the input feature pattern vector $fA_2ji$ is calculated for each feature extraction matrix Fi (that is, for each registered person). The input feature pattern vectors $fA_2ji$ are independent of a statistic property difference between the first image pattern obtaining process using the image scanner 13 and the second image pattern obtaining process using the video camera 12.

Thereafter, an average input feature pattern vector $fA_2i$ corresponding to each registered person is calculated according to a following equation.

$$fA_2i = (1/L)\sum_{j=1}^{L} fA_2ji \quad (25)$$

Thereafter, a similarity between the average input feature pattern vector $fA_2i$ corresponding to one registered person and one referential face image pattern $fB_1i$ corresponding to the same registered person is estimated according to an optimum match processing for each referential face image pattern stored in the referential face image data base 30 (that is, for each registered person) to judge whether or not the average input feature pattern vector $fA_2i$ corresponding to one registered person is identical with one referential face image pattern $fB_1i$ corresponding to the same registered person, and one or more referential face image patterns respectively similar to the average input feature pattern vector $fA_2i$ corresponding to the same registered person are selected as one or more recognized referential face image patterns (step S314). Thereafter, one or more recognized face images indicated by the recognized referential face image patterns are displayed on the display 17 as one or more candidates for the specific person, or the recognized referential face image patterns are output to the output terminal 18 (step S315).

In this embodiment, a set of referential face image patterns is determined from a set of referential identification face images obtained by using the image scanner 13. However, because a feature extraction transformation using the feature extraction matrix Fi is performed for each face image pattern to obtain the set of referential face image patterns, even though a set of referential video face images are obtained by using the video camera 12, a set of referential face image patterns can be determined from the set of referential video face images.

Also, in this embodiment, a group of input face images of the specific person are obtained by using the video camera 12. However, because a feature extraction transformation using the feature extraction matrix Fi is performed for the input face image patterns, even though the input face image of the specific person is obtained by using the image scanner 13, the average input feature pattern vector $fA_2i$ independent of a statistic property difference between the first image pattern obtaining process and the second image pattern obtaining process can be obtained.

Accordingly, because the feature extraction matrix Fi, which minimizes an overlapping area between the pattern distribution of a face image pattern of one registered person (or a group of face image patterns of one registered person) and the perturbation distribution of the face image pattern, is assumed in advance for each registered person by using a group of video face images and one identification face image, one referential face image pattern independent of a statistic property difference between the first image pattern obtaining process using the image scanner 13 and the second image pattern obtaining process using the video camera 12 can be obtained for each registered person, and one or more referential face image patterns most similar to a face image pattern corresponding to a specific person can be selected regardless of whether the face image pattern is obtained according to the first image pattern obtaining process or the second image pattern obtaining process.

In this embodiment, the perturbation covariance matrix Cp(i) is calculated according to the equation (17) by using the pattern perturbation Pji. However, it is applicable that a pattern perturbation Pi be calculated by using the average pattern vector ai and the perturbation covariance matrix Cp(i) be calculated by using the pattern perturbation Pi. That is, a pattern perturbation Pi of the i-th registered person is calculated in the pattern perturbation calculating means 82 according to a following equation Pi=ai−bi, a perturbation covariance matrix Cp(i) is calculated for each registered person in the perturbation covariance assuming means 83 by using the pattern perturbations Pi according to a following equation.

$$Cp(i) = PiPi^T$$

Also, a moving picture composed of a series of still pictures is obtained for each registered person by directly photographing the face of the registered person with the video camera 12, and one teaching video face image pattern is produced for each still picture. However, the third embodiment is not limited to obtain a moving picture composed of a series of still pictures for each registered person. That is, it is applicable that a still picture be obtained for each registered person by directly photographing the face of the registered person with the video camera 12 and one teaching video face image pattern ai be produced for each registered person. In this case, a pattern perturbation Pi of the i-th registered person is calculated in the pattern perturbation calculating means 82 according to a following equation Pi=ai−bi, a perturbation covariance matrix cp(i) is calculated for each registered person in the perturbation covariance assuming means 83 by using the pattern perturbations Pi according to a following equation.

$$Cp(i) = PiPi^T$$

Also, in this embodiment, the referential identification face image patterns $B_1i$ are obtained by scanning the face photographs of the registered persons by the image scanner 13, and the input face image pattern $A_2j$ is obtained by directly photographing the specific person with the video camera 12. However, it is applicable that the referential identification face image patterns be obtained by directly photographing the registered persons and the input face image pattern be obtained by scanning the face photograph of the specific person. In this case, a group of referential identification face image patterns $A_1ji$ are obtained for each registered person, an average referential identification face image pattern $A_1i$ of each registered person is calculated according to a following equation $$A_1i = (1/L)\sum_{j=1}^{L} A_1ji,$$

a referential feature pattern vector $fA_1i=FiA_1i$ is obtained, an input face image pattern $B_2$ of the specific person is obtained, an input feature pattern vector $fB_2i$ corresponding to each registered person is calculated according to a following equation $$fB_2i = FiB_2i,$$

and the average referential identification face image pattern $A_1i$ is collated with the input feature pattern vector $fB_2i$ for each registered person in the optimum match processing performing means 73.

Also, the video camera 12 and the image scanner 13 are used as image receiving means. However, the image receiving means is not limited to the video camera 12 and the image scanner 13, and it is applicable that two or more image receiving units be used as the image receiving means.

Also, the set of referential face image patterns is obtained in the off-line processing. However, it is applicable that a set of referential face image patterns obtained in an external apparatus be stored in advance in the auxiliary storing unit 16.

Also, the set of referential face image patterns obtained in the off-line processing is stored in the referential face image data base 30. However, it is applicable that the set of referential face image patterns be stored in advance in the auxiliary storing unit 16.

Also, in this embodiment, a face image pattern is recognized in the pattern recognizing apparatus 11. However, it is applicable that an image pattern of a mobil car, parts or the like be recognized in the pattern recognizing apparatus 11. Also, it is applicable that patterned data obtained from audio data, character data or the like be recognized in the pattern recognizing apparatus 11.

Fourth Embodiment

In a fourth embodiment, the judgement whether or not a specific person is identical with a photograph person corresponding to an identification card exhibited by the specific person is performed in a pattern identity judging apparatus according to a pattern identity judging method by collating a video face image pattern obtained by directly photographing a face of the specific person with a photograph face image pattern obtained by scanning a face photograph of the identification card. A hardware of the pattern identity judging apparatus is the same as that of the pattern recognizing apparatus 11 shown in FIG. 1.

Figure 14:
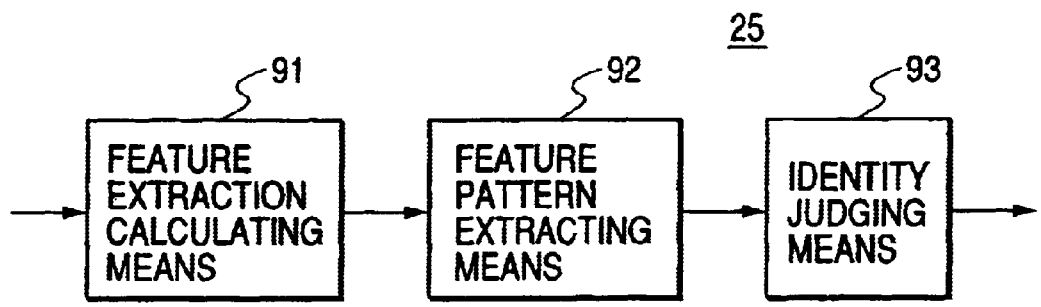
FIG. 14 is a block diagram showing a functional structure of the CPU 25 arranged in a pattern identity judging apparatus according to a forth embodiment of the present invention.

FIG. 14 is a block diagram showing a functional structure of the CPU 25 arranged in the pattern identity judging apparatus 11 according to a fourth embodiment of the present invention.

As shown in FIG. 14, the CPU 25 comprises a feature extraction calculating means 91 for calculating a feature extraction matrix F from the teaching video face images and the teaching identification face images;

a feature pattern extracting means 92 for performing a feature extraction transformation using the feature extraction matrix F for a first input face image pattern $a_{in}$ of a first input face image, which is obtained by directly photographing a face of a specific person in the video camera 12, to produce a first input feature pattern vector $fa_{in}$, and performing a feature extraction transformation using the feature extraction matrix F for a second input face image pattern $b_{in}$ of a second input face image, which is obtained by scanning a face photograph of a photograph person attached to an identification card in the image scanner 13, to produce a second input feature pattern vector $fb_{in}$; and an identity judging means 93 for estimating a similarity between the first input feature pattern vector $fa_{in}$ and the second input feature pattern vector $fb_{in}$ by collating the first input feature pattern vector $fa_{in}$ with the second input feature pattern vector $fb_{in}$ and judging according to the similarity whether or not the specific person corresponding to the first input feature pattern vector $fa_{in}$ is identical with the photograph person of the face photograph corresponding to the second input feature pattern vector $fb_{in}$.

Figure 15:
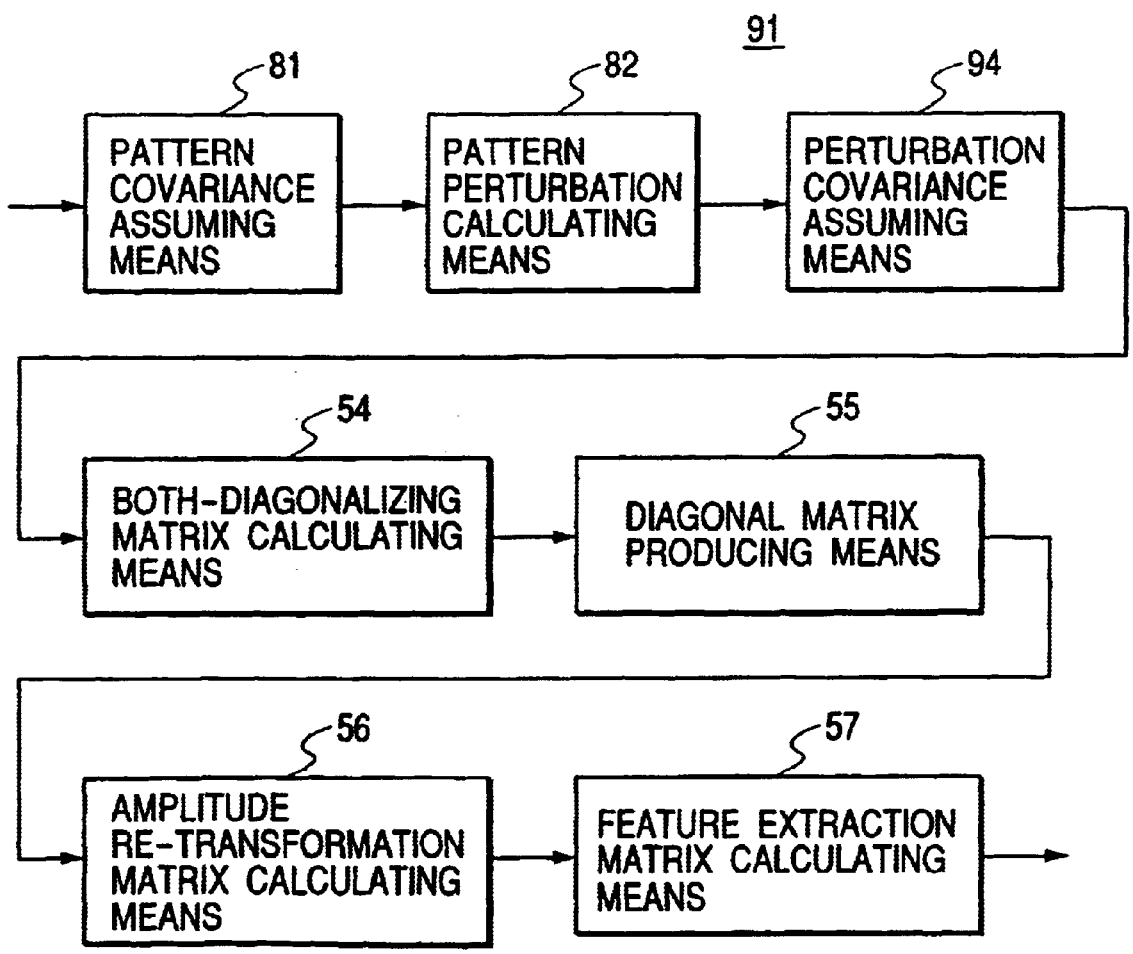
FIG. 15 is a block diagram of a feature extraction matrix calculating means arranged in the CPU according to the fourth embodiment.

FIG. 15 is a block diagram of the feature extraction matrix calculating means 91.

As shown in FIG. 15, the feature extraction calculating means 71 comprises the pattern covariance assuming means 81;

the pattern perturbation calculating means 82;

a perturbation covariance assuming means 94 for assuming a perturbation covariance matrix Cp(i) of the pattern perturbations Pji (j=1 to L) calculated in the pattern perturbation calculating means 82 for each registered person and calculating an average perturbation covariance matrix Cp from the perturbation covariance matrices Cp(i) of the registered persons;

the both-diagonalizing matrix calculating means 54 for calculating a both-diagonalizing matrix H;

the diagonal matrix producing means 55 for diagonalizing the pattern covariance matrix Cs to produce a diagonal matrix Ds of the pattern covariance matrix Cs and diagonalizing the perturbation covariance matrix Cp to produce a diagonal matrix Dp of the perturbation covariance matrix Cp;

the amplitude re-transformation matrix calculating means 56 for calculating an amplitude re-transformation matrix L; and the feature extraction matrix calculating means 57 for calculating a feature extraction matrix F=LH.

In the above configuration, an operation performed in the pattern identity judging apparatus 11 is described.

Figure 16:
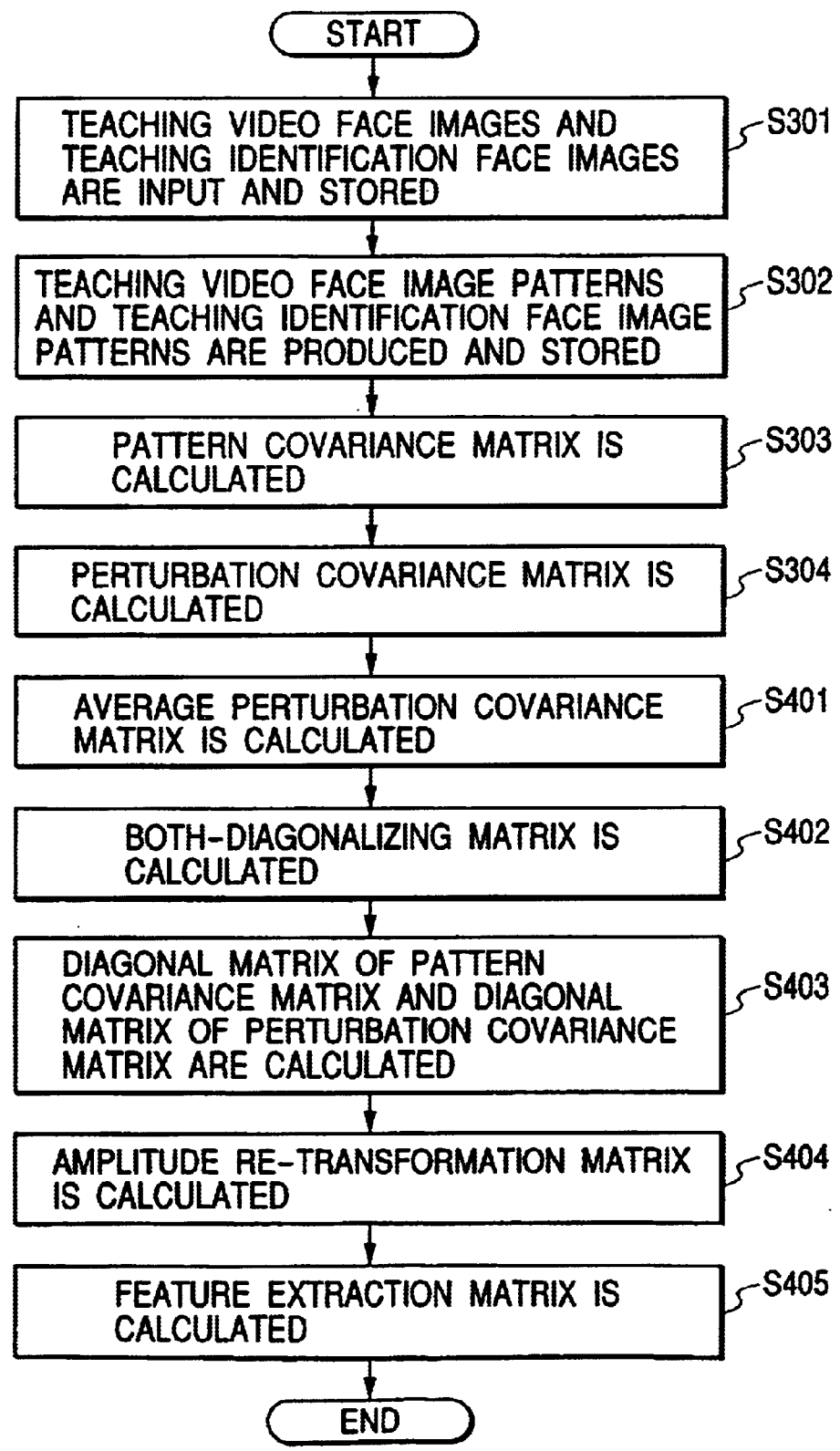
FIG. 16 shows an operation flow in an off-line processing initially performed in the pattern identity judging apparatus according the fourth embodiment.

FIG. 16 shows an operation flow in an off-line processing initially performed in the feature extraction calculating means 91 of the pattern identity judging apparatus 11.

As shown in FIG. 16, the pattern covariance matrix Cs and the perturbation covariance matrices Cp(i) are calculated in the steps S301 to S304 in the same manner as in the first embodiment.

Thereafter, an average perturbation covariance matrix Cp is calculated from the perturbation covariance matrices Cp(i) of the registered persons in the perturbation covariance assuming means 94 according to a following equation (step S401).

$$Cp = (1/M) \sum_{i=1}^{M} Cp(i) \qquad (26)$$

where M denotes a number of perturbation samples (M≦N).

Thereafter, a both-diagonalizing matrix H is calculated according to the equation (6) from the pattern covariance matrix Cs and the average perturbation covariance matrix Cp in the both-diagonalizing matrix calculating means 54 (step S402), a diagonal matrix Ds of the pattern covariance matrix Cs and a diagonal matrix Dp of the average perturbation covariance matrix Cp are calculated according to the equation (7) in the diagonal matrix producing means 55 (step S403), an amplitude re-transformation matrix L is calculated according to the equation (8) in the amplitude re-transformation matrix calculating means 56 (step S404), and a feature extraction matrix F is calculated according to the equation (10) in the feature extraction matrix calculating means 57 (step S405).

FIG. 17 shows an operation flow in an on-line processing performed in the pattern identity judging apparatus according to the fourth embodiment.

As shown in FIG. 17, when a specific person exhibits an identification card, a face of the specific person is directly photographed with the video camera 12 to obtain a moving picture composed of a series of still pictures. Each still picture indicates a first input face image. The group of first input face images of the specific person are stored in the video face image memory 21 (step S411). Also, a face photograph of the identification card is scanned by the image scanner 13 to obtain a second input face image, and the second input face image of the face photograph is stored in the identification face image memory 23 (step S411).

Thereafter, a group of first input face image patterns $a_{in}j$ of the specific person are produced from the group of first input face images (step S412), and a second input face image pattern $b_{in}$ of the photograph person is produced from the second input face image (step S412). Thereafter, an average of the first input face image patterns $a_{in}j$ is calculated according to a following equation to obtain a first average input face image patterns $a_{in}$ (step S413).

$$a_{in} = (1/L) \sum_{j=1}^{L} a_{in}j \qquad (27)$$

Thereafter, a first input feature pattern vector $fa_{in}$ of the specific person and a second input feature pattern vector $fb_{in}$ of the photograph person are calculated according to the equations (13) and (14) in the same manner as in the second embodiment (step S414), the first input feature pattern vector $fa_{in}$ is collated with the second input feature pattern vector $fb_{in}$ to judge in an on-line processing whether or not the specific person is identical with the photograph person (step S415).

In cases where a similarity between the first input feature pattern vector $fa_{in}$ and the second input feature pattern vector $fb_{in}$ is sufficiently high, it is judged that the specific person is identical with the photograph person, and a collation result indicating that the specific person is identical with the photograph person is displayed on the display 16 or is output to the output terminal 18 (step S205). In contrast, in cases where the similarity is not sufficiently high, it is judged that the specific person is not identical with the photograph person, and a collation result indicating that the specific person is not identical with the photograph person is displayed on the display 16 or is output to the output terminal 18 (step S416).

Accordingly, even though the processes for obtaining the two face images differ from each other, the judgement whether or not the specific person photographed by the video camera 12 is identical with the photograph person of the face photograph scanned by the image scanner 13 can be correctly performed. That is, in cases where the specific person is actually identical with the photograph person of the face photograph, a collation result indicating that the specific person is identical with the photograph person of the face photograph can be reliably obtained.

Also, even though a moving picture composed of a series of still pictures is obtained for each registered person, because the average perturbation covariance matrix Cp is calculated by averaging the perturbation covariance matrices Cp(i) of the registered persons, the feature extraction matrix F common to the registered persons can be obtained, so that the identity of a person photographed by the video camera 12 with a person expressed by a face photograph can be judged in the same manner as in the second embodiment.

In this embodiment, the video camera 12 and the image scanner 13 are used as image receiving means. However, the image receiving means-is not limited to the video camera 12 and the image scanner 13, and it is applicable that two or more image receiving units be used as the image receiving means.

Also, the set of teaching face image patterns is obtained in the off-line processing. However, it is applicable that a set of teaching face image patterns obtained in an external apparatus be stored in advance in the auxiliary storing unit 16.

Also, the set of teaching face image patterns obtained in the off-line processing is stored in the referential face image data base 30. However, it is applicable that the set of teaching face image patterns be stored in advance in the auxiliary storing unit 16.

Also, in this embodiment, two face image patterns are collated with each other in the pattern identity judging apparatus 11. However, it is applicable that image patterns of a mobil car, parts or the like be collated with each other in the pattern identity judging apparatus 11. Also, it is applicable that patterned data obtained from audio data, character data or the like be collated with each other in the pattern identity judging apparatus 11.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A pattern recognizing method, comprising the steps of:
    obtaining a set of first teaching patterns of a plurality of teaching samples according to a first pattern obtaining process;
    obtaining a set of second teaching patterns of the teaching samples according to a second pattern obtaining process differing from the first pattern obtaining process;
    calculating a teaching pattern distribution from the set of first teaching patterns or the set of second teaching patterns;
    calculating a teaching distribution of a perturbation between the set of first teaching patterns and the set of second teaching patterns;
    calculating a feature extraction matrix, which minimizes an overlapping area between the teaching pattern distribution and the teaching perturbation distribution, from the teaching pattern distribution and the teaching perturbation distribution;
    obtaining a set of referential patterns of a plurality of referential samples according to the first pattern obtaining process;
    calculating a set of referential feature patterns of the referential samples from the set of referential patterns according to the feature extraction matrix, the set of referential feature patterns being independent of the first pattern obtaining process and the second pattern obtaining process;
    receiving an input pattern of an input sample according to the second pattern obtaining process;
    calculating an input feature pattern of the input sample from the input pattern according to the feature extraction matrix;
    selecting a specific referential feature pattern most similar to the input feature pattern from the set of referential feature patterns; and
    recognizing a specific referential sample corresponding to the specific referential feature pattern as the input sample.

2. A pattern recognizing method according to claim 1 in which the step of calculating a teaching pattern distribution comprises the steps of
    calculating a teaching pattern covariance matrix of a pattern sample space from the set of first teaching patterns or the set of second teaching patterns; and
    assuming the teaching pattern covariance matrix as the teaching pattern distribution, the step of calculating a teaching distribution of a perturbation comprises the steps of calculating a teaching pattern perturbation between one first teaching pattern of one teaching sample and one second teaching pattern of the teaching sample for each teaching sample;

calculating a teaching perturbation covariance matrix from the teaching pattern perturbations of the teaching samples; and assuming the teaching perturbation covariance matrix as the teaching perturbation distribution, and the step of calculating a feature extraction matrix comprises the steps of calculating a both-diagonalizing matrix, which diagonalizes both the teaching pattern covariance matrix and the teaching perturbation covariance matrix, from the teaching pattern covariance matrix and the teaching perturbation covariance matrix;

diagonalizing the teaching pattern covariance matrix according to the both-diagonalizing matrix to produce a diagonal matrix of the teaching pattern covariance matrix;

diagonalizing the teaching perturbation covariance matrix according to the both-diagonalizing matrix to produce a diagonal matrix of the teaching perturbation covariance matrix;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and calculating the feature extraction matrix from the both-diagonalizing matrix and the amplitude re-transformation matrix.

3. A pattern recognizing method according to claim 2 in which the teaching pattern covariance matrix Cs is expressed in an equation $$Cs = (1/N)\sum_{i=1}^{N}(bi-m)(bi-m)^T$$

where bi denotes one first teaching pattern or one second teaching pattern of an i-th teaching sample, N denotes the number of teaching samples, and m denotes an average pattern of the set of first teaching patterns or the set of second teaching pattern, the teaching pattern perturbation Pi is expressed in an equation $$Pi=ai-bi$$

where ai and bi denotes one first teaching pattern and one second teaching pattern of an i-th teaching sample, the teaching perturbation covariance matrix Cp is expressed in an equation $$Cp = (1/M)\sum_{i=1}^{M}PiPi^T$$

where M denotes the number of perturbation samples selected from the teaching samples, the both-diagonalizing matrix H is expressed in an equation $$H=\Psi^T\Lambda^{-\frac{1}{2}}\Phi^T$$

where $\Phi$ denotes an eigenvector matrix of the teaching pattern covariance matrix Cs, $\Lambda$ denotes an eigenvalue matrix of the teaching pattern covariance matrix Cs, $\Psi$ denotes an eigenvector matrix of a matrix K defined in an equation $$K=(\Lambda^{-\frac{1}{2}}\Phi^T)Cp(\Lambda^{-\frac{1}{2}}\Phi^T)^T,$$

and $\Lambda^{-\frac{1}{2}}=\text{diag}[\sigma_1^{-\frac{1}{2}}, \sigma_2^{-\frac{1}{2}}, ---]$ is satisfied for the diagonal matrix $\Lambda=\text{diag}[\sigma_1, \sigma_2, ---]$, the diagonal matrix Ds of the teaching pattern covariance matrix Cs is expressed in an equation $$Ds=HCsH^T,$$

the diagonal matrix Dp of the teaching perturbation covariance matrix cp is expressed in an equation $$Dp=HCpH^T,$$

the amplitude re-transformation matrix L is expressed in an equation $$L=\text{diag}[(\lambda_1^{(s)n}+\lambda_1^{(p)n})^{-\frac{1}{2n}}, (\lambda_2^{(s)n}+\lambda_2^{(p)n})^{-\frac{1}{2n}}, ---]$$

where n denotes an arbitral real number, the feature extraction matrix F is expressed in an equation $$F=LH,$$

each referential feature pattern fbi is expressed as a product of F and bi in an equation $$fbi=Fbi$$

where bi denotes a vector of one referential pattern, and the input feature pattern $fa_2$ is expressed as a product of F and $a_2$ in an equation $$fa_2=Fa_2$$

where $a_2$ denotes a vector of the input pattern.

4. A pattern recognizing method according to claim 1 in which the step of calculating a teaching distribution of a perturbation comprises the step of calculating a teaching perturbation distribution between one first teaching pattern of one teaching sample and one second teaching pattern of the teaching sample for each teaching sample, the step of calculating a feature extraction matrix comprises the step of calculating a feature extraction matrix, which minimizes an overlapping area between a teaching pattern distribution of one teaching sample and the teaching perturbation distribution of the teaching sample, from the teaching pattern distribution and the teaching perturbation distribution of the teaching sample for each teaching sample, the step of obtaining a set of referential patterns comprises the step of obtaining a set of referential patterns of the teaching samples according to the first pattern obtaining process or the second pattern obtaining process, the step of calculating a set of referential feature patterns comprises the step of calculating one referential feature pattern of one teaching sample from one referential pattern of the teaching sample according to the feature extraction matrix of the teaching sample for each teaching sample, the step of calculating an input feature pattern comprises the step of calculating an input feature pattern of the input sample from the input pattern according to the feature extraction matrix of one teaching sample for each teaching sample, and the step of selecting a specific referential feature pattern comprises the steps of estimating a similarity between one input feature pattern corresponding to one teaching sample and one referential feature pattern of the same teaching sample; and selecting a specific referential feature pattern of a specific teaching sample most similar to the input feature pattern corresponding to the teaching sample from the set of referential feature patterns.

5. A pattern recognizing method according to claim 4 in which the step of calculating a teaching pattern distribution comprises the steps of calculating a teaching pattern covariance matrix of a pattern sample space from the set of first teaching patterns or the set of second teaching patterns; and assuming the teaching pattern covariance matrix as the teaching pattern distribution, the step of calculating a teaching perturbation distribution comprises the steps of calculating a teaching pattern perturbation between one first teaching pattern of one teaching sample and one second teaching pattern of the teaching sample for each teaching sample;

calculating a teaching perturbation covariance matrix from one teaching pattern perturbation of one teaching sample for each teaching sample; and assuming the teaching perturbation covariance matrix as the teaching perturbation distribution for each teaching sample, and the step of calculating a feature extraction matrix comprises the steps of calculating a both-diagonalizing matrix, which diagonalizes both the teaching pattern covariance matrix and the teaching perturbation covariance matrix of one teaching sample, from the teaching pattern covariance matrix and the teaching perturbation covariance matrix for each teaching sample;

diagonalizing the teaching pattern covariance matrix according to the both-diagonalizing matrix of each teaching sample to produce a diagonal matrix of the teaching pattern covariance matrix corresponding to one teaching sample for each teaching sample;

diagonalizing the teaching perturbation covariance matrix of one teaching sample according to the both-diagonalizing matrix of the teaching sample for each teaching sample to produce a diagonal matrix of the teaching perturbation covariance matrix for each teaching sample;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices corresponding to one teaching sample for each teaching sample; and calculating the feature extraction matrix corresponding to one teaching sample from the both-diagonalizing matrix corresponding to the teaching sample and the amplitude re-transformation matrix corresponding to the teaching sample for each teaching sample.

6. A pattern recognizing method according to claim 5 in which the teaching pattern covariance matrix Cs is expressed in an equation $$Cs = (1/N)\sum_{i=1}^{N}(bi-m)(bi-m)^T$$

where bi denotes one first teaching pattern or one second teaching pattern of an i-th teaching sample, N denotes the number of teaching samples, and m denotes an average pattern of the set of first teaching patterns or the set of second teaching pattern, the teaching pattern perturbation Pi is expressed in an equation $$Pi=ai-bi$$

where ai and bi denotes one first teaching pattern and one second teaching pattern of an i-th teaching sample, the teaching perturbation covariance matrix Cp(i) corresponding to each teaching sample is expressed in an equation $$Cp(i)=PiPi^T,$$

the both-diagonalizing matrix Hi corresponding to each teaching sample is expressed in an equation $$Hi=\Psi^T \Lambda^{-\frac{1}{2}} \Phi^T$$

where $\Phi$ denotes an eigenvector matrix of the teaching pattern covariance matrix Cs, $\Lambda$ denotes an eigenvalue matrix of the teaching pattern covariance matrix Cs, $\Psi$ denotes an eigenvector matrix of a matrix K defined in an equation $$K=(\Lambda^{-\frac{1}{2}}\Phi^T)Cp(i)(\Lambda^{-\frac{1}{2}}\Phi^T)^T,$$

and $\Lambda^{-\frac{1}{2}}=\text{diag}[\sigma_{t1}^{-\frac{1}{2}}, \sigma_{t2}^{-\frac{1}{2}}, ---]$ is satisfied for the diagonal matrix $\Lambda=\text{diag}[\sigma_{t1}, \sigma_{t2}, ---]$, the diagonal matrix Ds(i) of the teaching pattern covariance matrix Cs corresponding to each teaching sample is expressed in an equation $$Ds(i)=HiCsHi^T,$$

the diagonal matrix Dp(i) of the teaching perturbation covariance matrix Cp(i) corresponding to each teaching sample is expressed in an equation $$Dp(i)=HiCp(i)Hi^T,$$

the amplitude re-transformation matrix Li corresponding to each teaching sample is expressed in an equation $$Li=\text{diag}[(\lambda_{t1}^{(s)n}+\lambda_{t1}^{(p)n})^{-\frac{1}{2n}}, (\lambda_{t2}^{(s)n}+\lambda_{t2}^{(p)n})^{-\frac{1}{2n}}, ---]$$

where n denotes an arbitral real number,
the feature extraction matrix Fi corresponding to each teaching sample is expressed in an equation $$Fi=LiHi,$$

the referential feature pattern fbi corresponding to each teaching sample is expressed as a product of Fi and bi in an equation $$fbi = Fibi$$

where bi denotes a vector of one referential pattern, and the input feature pattern $fa_2i$ corresponding to each teaching sample is expressed as a product of Fi and $a_2$ in an equation $$fa_2i = Fia_2$$

where $a_2$ denotes a vector of the input pattern.

7. A pattern recognizing method according to claim 1 in which the step of obtaining a set of second teaching patterns comprises the step of obtaining a group of second teaching patterns for each teaching sample, the step of calculating a teaching distribution of a perturbation comprises the step of calculating a teaching perturbation distribution between one first teaching pattern of one teaching sample and one group of second teaching patterns of the teaching sample for each teaching sample, the step of calculating a feature extraction matrix comprises the step of calculating a feature extraction matrix, which minimizes an overlapping area between a teaching pattern distribution of one teaching sample and the teaching perturbation distribution of the teaching sample, from the teaching pattern distribution and the teaching perturbation distribution of the teaching sample for each teaching sample, the step of obtaining a set of referential patterns comprises the step of obtaining a set of referential patterns of the teaching sample according to the first pattern obtaining process, the step of receiving an input pattern comprises the step of obtaining a group of input patterns of the input sample according to the second pattern obtaining process, the step of calculating an input feature pattern comprises the steps of calculating a group of input feature patterns of the input sample from the group of input patterns according to the feature extraction matrix of one teaching sample for each teaching sample; and calculating an average input feature pattern from the group of input feature patterns for each teaching sample, and the step of selecting a specific referential feature pattern comprises the steps of estimating a similarity between one average input feature pattern corresponding to one teaching sample and one average referential feature pattern of the same teaching sample; and selecting a specific average referential feature pattern of a specific teaching sample most similar to the average input feature pattern corresponding to the teaching sample from the set of average referential feature patterns.

8. A pattern recognizing method according to claim 7 in which the step of calculating a teaching pattern distribution comprises the steps of calculating a teaching pattern covariance matrix of a pattern sample space from the set of first teaching patterns or the set of second teaching patterns; and assuming the teaching pattern covariance matrix as the teaching pattern distribution, the step of calculating a teaching perturbation distribution comprises the steps of calculating a group of teaching pattern perturbations between one first teaching pattern of one teaching sample and one group of second teaching patterns of the teaching sample for each teaching sample;

calculating a teaching perturbation covariance matrix from one group of teaching pattern perturbations of one teaching sample for each teaching sample; and assuming the teaching perturbation covariance matrix as the teaching perturbation distribution for each teaching sample, and the step of calculating a feature extraction matrix comprises the steps of calculating a both-diagonalizing matrix, which diagonalizes both the teaching pattern covariance matrix and the teaching perturbation covariance matrix of one teaching sample, from the teaching pattern covariance matrix and the teaching perturbation covariance matrix for each teaching sample;

diagonalizing the teaching pattern covariance matrix according to the both-diagonalizing matrix of each teaching sample to produce a diagonal matrix of the teaching pattern covariance matrix corresponding to one teaching sample for each teaching sample;

diagonalizing the teaching perturbation covariance matrix of one teaching sample according to the both-diagonalizing matrix of the teaching sample for each teaching sample to produce a diagonal matrix of the teaching perturbation covariance matrix for each teaching sample;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices corresponding to one teaching sample for each teaching sample; and calculating the feature extraction matrix corresponding to one teaching sample from the both-diagonalizing matrix corresponding to the teaching sample and the amplitude re-transformation matrix corresponding to the teaching sample for each teaching sample.

9. A pattern recognizing method according to claim 8 in which the teaching pattern covariance matrix Cs is expressed in an equation $$Cs = (1/N) \sum_{i=1}^{N} (bi-m)(bi-m)^T$$

where bi denotes one first teaching pattern or one second teaching pattern of an i-th teaching sample, N denotes the number of teaching samples, and m denotes an average pattern of the set of first teaching patterns or the set of second teaching pattern, each teaching pattern perturbation Pji is expressed in an equation $$Pji = aji - bi \ (i=1 \text{ to } N, \text{ and } j=1 \text{ to } L)$$

where aji denotes one second teaching pattern of an i-th teaching sample, L denotes the number of second teaching patterns in one group corresponding to one teaching sample and bi denotes one first teaching pattern of an i-th sample, the teaching perturbation covariance matrix Cp(i) corresponding to each teaching sample is expressed in an equation $$Cp(i) = (1/L)\sum_{j=1}^{L} PjiPji^T,$$

the both-diagonalizing matrix Hi corresponding to each teaching sample is expressed in an equation $$Hi=\Psi^T\Lambda^{-\frac{1}{2}}\Phi^T$$

where $\Phi$ denotes an eigenvector matrix of the teaching pattern covariance matrix Cs, $\Lambda$ denotes an eigenvalue matrix of the teaching pattern covariance matrix Cs, $\Psi$ denotes an eigenvector matrix of a matrix K defined in an equation $$K=(\Lambda^{-\frac{1}{2}}\Phi^T)Cp(i)(\Lambda^{-\frac{1}{2}}\Phi^T)^T,$$

and $\Lambda^{-\frac{1}{2}}=\mathrm{diag}[\sigma_{t1}^{-\frac{1}{2}}, \sigma_{t2}^{-\frac{1}{2}}, ---]$ is satisfied for the diagonal matrix $\Lambda=\mathrm{diag}[\sigma_{t1}, \sigma_{t2}, ---]$,
the diagonal matrix Ds(i) of the teaching pattern covariance matrix Cs corresponding to each teaching sample is expressed in an equation $$Ds(i)=HiCsHi^T,$$

the diagonal matrix Dp(i) of the teaching perturbation covariance matrix Cp(i) corresponding to each teaching sample is expressed in an equation $$Dp(i)=HiCp(i)Hi^T,$$

the amplitude re-transformation matrix Li corresponding to each teaching sample is expressed in an equation $$Li=\mathrm{diag}[(\lambda_{t1}^{(s)n}+\lambda_{t1}^{(p)n})^{-\frac{1}{2}n}, (\lambda_{t2}^{(s)n}+\lambda_{t2}^{(p)n})^{-\frac{1}{2}n}, ---]$$

where n denotes an arbitral real number,
the feature extraction matrix Fi corresponding to each teaching sample is expressed in an equation $$Fi=LiHi,$$

the referential feature pattern $fB_1i$ corresponding to each teaching sample is expressed as a product of Fi and $B_1i$ in an equation $$fB_1i=FiB_1i$$

where $B_1i$ denotes a vector of one referential pattern, the group of input feature patterns $fA_2ji$ corresponding to each teaching sample is expressed as a product of Fi and $A_2j$ in an equation $$fA_2ji=FiA_2j (j=1 \text{ to } L)$$

where $A_2j$ denotes a vector of each input pattern, and L denotes the number of input patterns, and
the average input feature pattern $fA_2j$ is expressed in an equation $$fA_2i = (1/L)\sum_{j=1}^{L} fA_2ji.$$

10. A pattern recognizing apparatus, comprising:
first pattern obtaining means for obtaining a set of first teaching patterns of a plurality of teaching samples according to a first pattern obtaining process;
second pattern obtaining means for obtaining a set of second teaching patterns of the teaching samples according to a second pattern obtaining process differing from the first pattern obtaining process;
feature extracting means for calculating a teaching pattern distribution from the set of first teaching patterns obtained by the first pattern obtaining means or the set of second teaching patterns obtained by the second pattern obtaining means, calculating a teaching distribution of a perturbation between the set of first teaching patterns and the set of second teaching patterns, and calculating a feature extraction matrix, which minimizes an overlapping area between the teaching pattern distribution and the teaching perturbation distribution, from the teaching pattern distribution and the teaching perturbation distribution;
referential feature pattern calculating means for obtaining a set of referential patterns of a plurality of referential samples according to the first pattern obtaining process, and calculating a set of referential feature patterns of the referential samples from the set of referential patterns according to the feature extraction matrix calculated by the feature extracting means to make the set of referential feature patterns independent of the first pattern obtaining process and the second pattern obtaining process; and
input pattern recognizing means for receiving an input pattern of an input sample according to the second pattern obtaining process, calculating an input feature pattern of the input sample from the input pattern according to the feature extraction matrix calculated by the feature extracting means, selecting a specific referential feature pattern most similar to the input feature pattern from the set of referential feature patterns calculated by the referential feature pattern calculating means, and recognizing a specific referential sample corresponding to the specific referential feature pattern as the input sample.

11. A pattern recognizing apparatus according to claim 10 in which the feature extracting means comprises
pattern covariance assuming means for calculating a teaching pattern covariance matrix of a pattern sample space from the first teaching patterns or the second teaching patterns and assuming the teaching pattern covariance matrix as the teaching pattern distribution;
pattern perturbation calculating means for calculating a teaching pattern perturbation between one first teaching pattern of one teaching sample and one second teaching pattern of the teaching sample for each teaching sample;
perturbation covariance assuming means for assuming a teaching perturbation covariance matrix from the teaching pattern perturbations calculated by the pattern perturbation calculating means as the teaching perturbation distribution;
both-diagonalizing matrix calculating means for calculating a both-diagonalizing matrix, which diagonalizes both the teaching pattern covariance matrix assumed by the pattern covariance assuming means and the teaching perturbation covariance matrix assumed by the perturbation covariance assuming means, from the teaching pattern covariance matrix and the teaching perturbation covariance matrix;
diagonal matrix producing means for diagonalizing the teaching pattern covariance matrix assumed by the pattern covariance assuming means according to the both-diagonalizing matrix calculated by the both-diagonalizing matrix calculating means to produce a diagonal matrix of the teaching pattern covariance matrix, and diagonalizing the teaching perturbation covariance matrix assumed by the perturbation covariance assuming means according to the both-diagonalizing matrix to produce a diagonal matrix of the teaching perturbation covariance matrix;

amplitude re-transformation matrix calculating means for calculating an amplitude re-transformation matrix, which again transforms a referential pattern covariance matrix indicated by the set of referential feature patterns to be calculated by the referential feature pattern calculating means to adjust amplitudes of diagonal elements of the referential pattern covariance matrix after the referential pattern covariance matrix is transformed by the both-diagonalizing matrix calculated by the both-diagonalizing matrix calculating means to be diagonalized, from the diagonal matrices; and calculating the feature extraction matrix from the both-diagonalizing matrix calculated by the both-diagonalizing matrix calculating means and the amplitude re-transformation matrix calculated by the amplitude re-transformation matrix calculating means.

12. A pattern recognizing apparatus, comprising:

first pattern obtaining means for obtaining a set of first teaching patterns of a plurality of registered samples according to a first pattern obtaining process;

second pattern obtaining means for obtaining a set of second teaching patterns of the registered samples according to a second pattern obtaining process differing from the first pattern obtaining process;

feature extracting means for calculating a teaching pattern distribution from the first teaching patterns obtained by the first pattern obtaining means or the second teaching patterns obtained by the second pattern obtaining means, calculating a teaching distribution of a perturbation between one first teaching pattern of one registered sample and one second teaching pattern of the registered sample for each registered sample, and calculating a feature extraction matrix, which minimizes an overlapping area between the teaching pattern distribution of one registered sample and the teaching perturbation distribution of the registered sample, from the teaching pattern distribution and the teaching perturbation distribution for each registered sample;

referential feature pattern calculating means for obtaining a set of referential patterns of the registered samples according to the first pattern obtaining process, and calculating a referential feature pattern of one registered sample from one referential pattern of the registered sample according to the feature extraction matrix of the registered sample calculated by the feature extracting means for each registered sample to make each referential feature pattern independent of the first pattern obtaining process and the second pattern obtaining process; and input pattern recognizing means for receiving an input pattern of an input sample according to the second pattern obtaining process, calculating an input feature pattern corresponding to one registered sample from the input pattern according to the feature extraction matrix of the registered sample calculated by the feature extracting means for each registered sample, estimating a similarity between one referential feature pattern of one registered sample and the input feature pattern corresponding to the registered sample for each registered sample, selecting a specific referential feature pattern most similar to the input feature pattern from the referential feature patterns calculated by the referential feature pattern calculating means, and recognizing a specific registered sample corresponding to the specific referential feature pattern as the input sample.

13. A pattern recognizing apparatus according to claim 12 in which the feature extracting means comprises pattern covariance assuming means for calculating a teaching pattern covariance matrix of a pattern sample space from the first teaching patterns or the second teaching patterns and assuming the teaching pattern covariance matrix as the teaching pattern distribution;

pattern perturbation calculating means for calculating a teaching pattern perturbation between one first teaching pattern of one registered sample and one second teaching pattern of the registered sample for each registered sample;

perturbation covariance assuming means for calculating a teaching perturbation covariance matrix from one teaching pattern perturbation calculated by the pattern perturbation calculating means for each registered person and assuming each teaching perturbation covariance matrix as the teaching perturbation distribution;

both-diagonalizing matrix calculating means for calculating a both-diagonalizing matrix, which diagonalizes both the teaching pattern covariance matrix assumed by the pattern covariance assuming means and the teaching perturbation covariance matrix assumed by the perturbation covariance assuming means, from the teaching pattern covariance matrix and the teaching perturbation covariance matrix for each registered person;

diagonal matrix producing means for diagonalizing the teaching pattern covariance matrix assumed by the pattern covariance assuming means according to the both-diagonalizing matrix calculated by the both-diagonalizing matrix calculating means for each registered person to produce a diagonal matrix of the teaching pattern covariance matrix for each registered person, and diagonalizing the teaching perturbation covariance matrix assumed by the perturbation covariance assuming means according to the both-diagonalizing matrix for each registered person to produce a diagonal matrix of the teaching perturbation covariance matrix for each registered person;

amplitude re-transformation matrix calculating means for calculating an amplitude re-transformation matrix, which again transforms a referential pattern covariance matrix indicated by the set of referential feature patterns to be calculated by the referential feature pattern calculating means to adjust amplitudes of diagonal elements of the referential pattern covariance matrix after the referential pattern covariance matrix is transformed by the both-diagonalizing matrix calculated by the both-diagonalizing matrix calculating means to be diagonalized, from the diagonal matrices corresponding one registered sample for each registered person; and calculating the feature extraction matrix from the both-diagonalizing matrix calculated by the both-diagonalizing matrix calculating means and the amplitude re-transformation matrix calculated by the amplitude re-transformation matrix calculating means for each registered person.

14. A pattern identity judging method, comprising the steps of:

obtaining a set of first teaching patterns from a plurality of teaching samples according to a first pattern obtaining process;

obtaining a set of second teaching patterns from the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

receiving a first input pattern of a first input sample according to the first pattern obtaining process;

calculating a first input feature pattern of the first input sample from the first input pattern according to the feature extraction matrix, the first input feature pattern being independent of the first pattern obtaining process and the second pattern obtaining process;

receiving a second input pattern of a second input sample according to the second pattern obtaining process;

calculating a second input feature pattern of the second input sample from the second input pattern according to the feature extraction matrix, the second input feature pattern being independent of the first pattern obtaining process and the second pattern obtaining process;

collating the first input feature pattern with the second input feature pattern to estimate a similarity between the first input sample and the second input sample; and judging that the first input sample is identical with the second input sample in cases where the similarity is high.

15. A pattern identity judging method according to claim 14 in which the step of calculating a teaching pattern distribution comprises the step of assuming a teaching pattern covariance matrix of a pattern sample space as the teaching pattern distribution, the step of calculating a teaching distribution of a perturbation comprises the steps of calculating a teaching pattern perturbation between one first teaching pattern of one teaching sample and one second teaching pattern of the teaching sample for each teaching sample; and assuming a teaching perturbation covariance matrix from the teaching pattern perturbations as the teaching perturbation distribution, and the step of calculating a feature extraction matrix comprises the steps of calculating a both-diagonalizing matrix, which diagonalizes both the teaching pattern covariance matrix and the teaching perturbation covariance matrix, from the teaching pattern covariance matrix and the teaching perturbation covariance matrix;

diagonalizing the teaching pattern covariance matrix according to the both-diagonalizing matrix to produce a diagonal matrix of the teaching pattern covariance matrix;

diagonalizing the teaching perturbation covariance matrix according to the both-diagonalizing matrix to produce a diagonal matrix of the teaching perturbation covariance matrix;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and calculating the feature extraction matrix from the both-diagonalizing matrix and the amplitude re-transformation matrix.

16. A pattern identity judging method according to claim 15 in which the teaching pattern covariance matrix Cs is expressed in an equation $$Cs = (1/N)\sum_{i=1}^{N}(bi-m)(bi-m)^T$$

where bi denotes one first teaching pattern or one second teaching pattern of an i-th teaching sample, N denotes the number of teaching samples, and m denotes an average pattern of the set of first teaching patterns or the set of second teaching pattern, the teaching pattern perturbation Pi is expressed in an equation $$Pi = ai - bi$$

where ai and bi denotes one first teaching pattern and one second teaching pattern of an i-th teaching sample, the teaching perturbation covariance matrix Cp is expressed in an equation $$Cp = (1/M)\sum_{i=1}^{M} PiPi^T$$

where M denotes the number of perturbation samples selected from the teaching samples, the both-diagonalizing matrix H is expressed in an equation $$H = \Psi^T \Lambda^{-\frac{1}{2}} \Phi^T$$

where $\Phi$ denotes an eigenvector matrix of the teaching pattern covariance matrix Cs, $\Lambda$ denotes an eigenvalue matrix of the teaching pattern covariance matrix Cs, $\Psi$ denotes an eigenvector matrix of a matrix K defined in an equation $$K = (\Lambda^{-\frac{1}{2}}\Phi^T)Cp(\Lambda^{-\frac{1}{2}}\Phi^T)^T,$$

and $\Lambda^{-\frac{1}{2}} = \mathrm{diag}[\sigma_1^{-\frac{1}{2}}, \sigma_2^{-\frac{1}{2}}, \mbox{- - -}]$ is satisfied for the diagonal matrix $\Lambda = \mathrm{diag}[\sigma_1, \sigma_2, \mbox{- - -}]$, the diagonal matrix Ds of the teaching pattern covariance matrix Cs is expressed in an equation $$Ds = HCsH^T,$$

the diagonal matrix Dp of the teaching perturbation covariance matrix Cp is expressed in an equation $$Dp = HCpH^T,$$

the amplitude re-transformation matrix L is expressed in an equation $$L = \text{diag}[(\lambda_1^{(s)n} + \lambda_1^{(p)n})^{-\frac{1}{2}n}, (\lambda_2^{(s)n} + \lambda_2^{(p)n})^{-\frac{1}{2}n}, ---]$$

where n denotes an arbitral real number,
the feature extraction matrix F is expressed in an equation $$F = LH,$$

the first input feature pattern $fa_{in}$ is expressed as a product of F and $a_{in}$ in an equation $$fa_{in} = Fa_{in}$$

where $a_{in}$ denotes a vector of the first input pattern, and the second input feature pattern $fb_{in}$ is expressed as a product of F and $b_{in}$ in an equation $$fb_{in} = Fb_{in}$$

where $b_{in}$ denotes a vector of the second input pattern.

17. A pattern identity judging method according to claim 14 in which
the step of obtaining a set of second teaching patterns comprises the step of
  obtaining a group of second teaching patterns for each teaching sample,
the step of calculating a teaching pattern distribution comprises the steps of
  calculating a teaching pattern covariance matrix of a pattern sample space from the set of first teaching patterns or the set of second teaching patterns; and
  assuming the teaching pattern covariance matrix as the teaching pattern distribution,
the step of calculating a teaching distribution of a perturbation comprises the steps of
  calculating a group of teaching pattern perturbations between one first teaching pattern of one teaching sample and one group of second teaching patterns of the teaching sample for each teaching sample;
  calculating a teaching perturbation covariance matrix from one group of teaching pattern perturbations of one teaching sample for each teaching sample;
  calculating an average teaching perturbation covariance matrix from the teaching perturbation covariance matrices; and
  assuming the average teaching perturbation covariance matrix as the teaching perturbation distribution,
the step of calculating a feature extraction matrix comprises the steps of
  calculating a both-diagonalizing matrix, which diagonalizes both the teaching pattern covariance matrix and the teaching perturbation covariance matrix, from the teaching pattern covariance matrix and the teaching perturbation covariance matrix;
  diagonalizing the teaching pattern covariance matrix according to the both-diagonalizing matrix to produce a diagonal matrix of the teaching pattern covariance matrix;
  diagonalizing the teaching perturbation covariance matrix according to the both-diagonalizing matrix to produce a diagonal matrix of the teaching perturbation covariance matrix;
  calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and
  calculating the feature extraction matrix from the both-diagonalizing matrix and the amplitude re-transformation matrix,
the step of receiving a second input pattern comprises the step of
  obtaining a group of second input patterns of the second input sample, and
the step of calculating a second input feature pattern comprises the steps of
  calculating an average of the group of second input patterns as a second input pattern newly defined; and
  calculating a second input feature pattern of the second input sample from the second input pattern newly defined.

18. A pattern identity judging method according to claim 17 in which
the teaching pattern covariance matrix Cs is expressed in an equation $$Cs = (1/N) \sum_{i=1}^{N} (bi - m)(bi - m)^T$$

where bi denotes one first teaching pattern of an i-th teaching sample, N denotes the number of teaching samples, and m denotes an average pattern of the set of first teaching patterns,
each teaching pattern perturbation Pji is expressed in an equation $$Pji = aji - bi \ (i=1 \text{ to } N, \text{ and } j=1 \text{ to } L)$$

where aji denotes one second teaching pattern of an i-th teaching sample, L denotes the number of second teaching patterns in one group corresponding to one teaching sample and bi denotes one first teaching pattern of an i-th teaching sample,
the teaching perturbation covariance matrix Cp(i) corresponding to each teaching sample is expressed in an equation $$Cp(i) = (1/L) \sum_{j=1}^{L} PjiPji^T,$$

the average teaching perturbation covariance matrix Cp is expressed in an equation $$Cp = (1/M) \sum_{i=1}^{M} Cp(i)$$

where M denotes the number of perturbation samples selected from the teaching samples,
the both-diagonalizing matrix H is expressed in an equation $$H = \Psi^T \Lambda^{-\frac{1}{2}} \Phi^T$$

where $\Phi$ denotes an eigenvector matrix of the teaching pattern covariance matrix Cs, $\Lambda$ denotes an eigenvalue matrix of the teaching pattern covariance matrix Cs, $\Psi$ denotes an eigenvector matrix of a matrix K defined in an equation $$K = (\Lambda^{-\frac{1}{2}} \Phi^T) Cp (\Lambda^{-\frac{1}{2}} \Phi^T)^T,$$

and $\Lambda^{-\frac{1}{2}}=\text{diag}[\sigma_1^{-\frac{1}{2}}, \sigma_2^{-\frac{1}{2}}, ---]$ is satisfied for the diagonal matrix $\Lambda=\text{diag}[\sigma_1, \sigma_2, ---]$,
the diagonal matrix Ds of the teaching pattern covariance matrix Cs is expressed in an equation $$Ds=HCsH^T,$$

the diagonal matrix Dp of the average teaching perturbation covariance matrix Cp is expressed in an equation $$Dp=HCpH^T,$$

the amplitude re-transformation matrix L is expressed in an equation $$L=\text{diag}[(\lambda_1^{(s)n}+\lambda_1^{(p)n})^{-\frac{1}{2}n}, (\lambda_2^{(s)n}+\lambda_2^{(p)n})^{-\frac{1}{2}n}, ---]$$

where n denotes an arbitral real number, the feature extraction matrix F is expressed in an equation $$F=LH,$$

the first input feature pattern $fb_{in}$ is expressed as a product of F and $b_{in}$ in an equation $$fb_{in}=Fb_{in}$$

where $b_{in}$ denotes a vector of the first input pattern, the average $a_{in}$ of the group of second input feature patterns $$a_{in} = (1/L)\sum_{j=1}^{L} a_{in}j$$

where $a_{in}j$ denotes a vector of each second input pattern, and each second input feature pattern $fa_{in}j$ is expressed as a product $fa_{in}=Fa_{in}$ of F and $a_{in}$ in an equation.

19. A pattern identity judging apparatus, comprising:
first pattern obtaining means for obtaining a set of first teaching patterns of a plurality of teaching samples according to a first pattern obtaining process;
second pattern obtaining means for obtaining a set of second teaching patterns of the teaching samples according to a second pattern obtaining process differing from the first pattern obtaining process;
feature extracting means for calculating a teaching pattern distribution from the set of first teaching patterns obtained by the first pattern obtaining means or the set of second teaching patterns obtained by the second pattern obtaining means, calculating a teaching distribution of a perturbation between the set of first teaching patterns and the set of second teaching patterns, and calculating a feature extraction matrix, which minimizes an overlapping area between the teaching pattern distribution and the teaching perturbation distribution, from the teaching pattern distribution and the teaching perturbation distribution;
feature pattern calculating means for receiving a first input pattern of a first input sample according to the first pattern obtaining process, receiving a second input pattern of a second input sample according to the second pattern obtaining process, calculating a first input feature pattern of the first input sample from the first input pattern according to the feature extraction matrix calculated by the feature extracting means to make the first input feature pattern independent of the first pattern obtaining process and the second pattern obtaining process, and calculating a second input feature pattern of the second input sample from the second input pattern according to the feature extraction matrix to make the second input feature pattern independent of the first pattern obtaining process and the second pattern obtaining process; and
identity judging means for collating the first input feature pattern calculated by the feature pattern calculating means with the second input feature pattern calculated by the feature pattern calculating means to estimate a similarity between the first input sample and the second input sample, and judging that the first input sample is identical with the second input sample in cases where the similarity is high.

20. A pattern identity judging apparatus according to claim 19 in which the feature extracting means comprises
pattern covariance assuming means for calculating a teaching pattern covariance matrix of a pattern sample space from the set of first teaching patterns or the set of second teaching patterns and assuming the teaching pattern covariance matrix as the teaching pattern distribution;
pattern perturbation calculating means for calculating a teaching pattern perturbation between one first teaching pattern of one teaching sample and one second teaching pattern of the teaching sample for each teaching sample;
perturbation covariance assuming means for assuming a teaching perturbation covariance matrix from the teaching pattern perturbations calculated by the pattern perturbation calculating means as the teaching perturbation distribution;
both-diagonalizing matrix calculating means for calculating a both-diagonalizing matrix, which diagonalizes both the teaching pattern covariance matrix assumed by the pattern covariance assuming means and the teaching perturbation covariance matrix assumed by the perturbation covariance assuming means, from the teaching pattern covariance matrix and the teaching perturbation covariance matrix;
diagonal matrix producing means for diagonalizing the teaching pattern covariance matrix assumed by the pattern covariance assuming means according to the both-diagonalizing matrix calculated by the both-diagonalizing matrix calculating means to produce a diagonal matrix of the teaching pattern covariance matrix, and diagonalizing the teaching perturbation covariance matrix assumed by the perturbation covariance assuming means according to the both-diagonalizing matrix to produce a diagonal matrix of the teaching perturbation covariance matrix;
amplitude re-transformation matrix calculating means for calculating an amplitude re-transformation matrix, which again transforms a referential pattern covariance matrix indicated by the set of referential feature patterns to be calculated by the referential feature pattern calculating means to adjust amplitudes of diagonal elements of the referential pattern covariance matrix after the referential pattern covariance matrix is transformed by the both-diagonalizing matrix calculated by the both-diagonalizing matrix calculating means to be diagonalized, from the diagonal matrices; and
calculating the feature extraction matrix from the both-diagonalizing matrix calculated by the both-diagonalizing matrix calculating means and the amplitude re-transformation matrix calculated by the amplitude re-transformation matrix calculating means.

21. A pattern identity judging apparatus, comprising:

first pattern obtaining means for obtaining a set of first teaching patterns of a plurality of teaching samples according to a first pattern obtaining process;

second pattern obtaining means for obtaining a group of second teaching patterns according to a second pattern obtaining process differing from the first pattern obtaining process for each teaching sample;

feature extracting means for calculating a teaching pattern distribution from the set of first teaching patterns obtained by the first pattern obtaining means or the group of second teaching patterns obtained by the second pattern obtaining means comprising:

means for calculating a teaching distribution of a perturbation between one first teaching pattern of one teaching sample and the group of second teaching patterns of the teaching sample for each teaching sample, means for calculating an average teaching perturbation distribution from the teaching perturbation distributions, and means for calculating a feature extraction matrix, which minimizes an overlapping area between the teaching pattern distribution and the average teaching perturbation distribution, from the teaching pattern distribution and the average teaching perturbation distribution;

feature pattern calculating means comprising:

means for receiving a first input pattern of a first input sample according to the first pattern obtaining process, means for receiving a second input pattern of a second input sample according to the second pattern obtaining process, means for calculating a first input feature pattern of the first input sample from the first input pattern according to the feature extraction matrix calculated by the feature extracting means to make the first input feature pattern independent of the first pattern obtaining process and the second pattern obtaining process, and means for calculating a second input feature pattern of the second input sample from the second input pattern according to the feature extraction matrix to make the second input feature pattern independent of the first pattern obtaining process and the second pattern obtaining process; and identity judging means for collating the first input feature pattern calculated by the feature pattern calculating means with the second input feature pattern calculated by the feature pattern calculating means to estimate a similarity between the first input sample and the second input sample, and judging that the first input sample is identical with the second input sample in cases where the similarity is high.

22. A pattern identity judging apparatus according to claim 21 in which the feature extracting means comprises pattern covariance assuming means for calculating a teaching pattern covariance matrix of a pattern sample space from the set of first teaching patterns or the groups of second teaching patterns and assuming the teaching pattern covariance matrix as the teaching pattern distribution;

pattern perturbation calculating means for calculating a group of teaching pattern perturbations between one first teaching pattern of one teaching sample and one group of second teaching patterns of the teaching sample for each teaching sample;

perturbation covariance assuming means for calculating a teaching perturbation covariance matrix from one group of teaching pattern perturbations calculated by the pattern perturbation calculating means for each teaching sample, calculating an average teaching perturbation covariance matrix from the teaching perturbation covariance matrices and assuming the average teaching perturbation covariance matrix as the average teaching perturbation distribution;

both-diagonalizing matrix calculating means for calculating a both-diagonalizing matrix, which diagonalizes both the teaching pattern covariance matrix assumed by the pattern covariance assuming means and the average teaching perturbation covariance matrix assumed by the perturbation covariance assuming means, from the teaching pattern covariance matrix and the average teaching perturbation covariance matrix;

diagonal matrix producing means for diagonalizing the teaching pattern covariance matrix assumed by the pattern covariance assuming means according to the both-diagonalizing matrix calculated by the both-diagonalizing matrix calculating means to produce a diagonal matrix of the teaching pattern covariance matrix, and diagonalizing the average teaching perturbation covariance matrix assumed by the perturbation covariance assuming means according to the both-diagonalizing matrix to produce a diagonal matrix of the average teaching perturbation covariance matrix;

amplitude re-transformation matrix calculating means for calculating an amplitude re-transformation matrix, which again transforms a referential pattern covariance matrix indicated by the set of referential feature patterns to be calculated by the referential feature pattern calculating means to adjust amplitudes of diagonal elements of the referential pattern covariance matrix after the referential pattern covariance matrix is transformed by the both-diagonalizing matrix calculated by the both-diagonalizing matrix calculating means to be diagonalized, from the diagonal matrices; and calculating the feature extraction matrix from the both-diagonalizing matrix calculated by the both-diagonalizing matrix calculating means and the amplitude re-transformation matrix calculated by the amplitude re-transformation matrix calculating means.

23. A recording medium for recording a software program of a pattern recognizing method executed in a computer, the pattern recognizing method, comprising the steps of:

obtaining a set of first teaching patterns of a plurality of teaching samples according to a first pattern obtaining process;

obtaining a set of second teaching patterns of the teaching samples according to a second pattern obtaining process differing from the first pattern obtaining process;

calculating a teaching pattern distribution from the set of first teaching patterns or the set of second teaching patterns;

calculating a teaching distribution of a perturbation between the set of first teaching patterns and the set of second teaching patterns;

calculating a feature extraction matrix, which minimizes an overlapping area between the teaching pattern distribution and the teaching perturbation distribution, from the teaching pattern distribution and the teaching perturbation distribution;

obtaining a set of referential patterns of a plurality of referential samples according to the first pattern obtaining process;

calculating a set of referential feature patterns of the referential samples from the set of referential patterns according to the feature extraction matrix, the set of referential feature patterns being independent of the first pattern obtaining process and the second pattern obtaining process;

receiving an input pattern of an input sample according to the second pattern obtaining process;

calculating an input feature pattern of the input sample from the input pattern according to the feature extraction matrix;

selecting a specific referential feature pattern most similar to the input feature pattern from the set of referential feature patterns; and recognizing a specific referential sample corresponding to the specific referential feature pattern as the input sample.

24. A recording medium according to claim 23 in which the step of calculating a teaching pattern distribution comprises the steps of calculating a teaching pattern covariance matrix of a pattern sample space from the set of first teaching patterns or the set of second teaching patterns; and assuming the teaching pattern covariance matrix as the teaching pattern distribution, the step of calculating a teaching distribution of a perturbation comprises the steps of calculating a teaching pattern perturbation between one first teaching pattern of one teaching sample and one second teaching pattern of the teaching sample for each teaching sample;

calculating a teaching perturbation covariance matrix from the teaching pattern perturbations of the teaching samples; and assuming the teaching perturbation covariance matrix as the teaching perturbation distribution, and the step of calculating a feature extraction matrix comprises the steps of calculating a both-diagonalizing matrix, which diagonalizes both the teaching pattern covariance matrix and the teaching perturbation covariance matrix, from the teaching pattern covariance matrix and the teaching perturbation covariance matrix;

diagonalizing the teaching pattern covariance matrix according to the both-diagonalizing matrix to produce a diagonal matrix of the teaching pattern covariance matrix;

diagonalizing the teaching perturbation covariance matrix according to the both-diagonalizing matrix to produce a diagonal matrix of the teaching perturbation covariance matrix;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and calculating the feature extraction matrix from the both-diagonalizing matrix and the amplitude re-transformation matrix.

25. A recording medium according to claim 23 in which the step of calculating a teaching distribution of a perturbation comprises the step of calculating a teaching perturbation distribution between one first teaching pattern of one teaching sample and one second teaching pattern of the teaching sample for each teaching sample, the step of calculating a feature extraction matrix comprises the step of calculating a feature extraction matrix, which minimizes an overlapping area between a teaching pattern distribution of one teaching sample and the teaching perturbation distribution of the teaching sample, from the teaching pattern distribution and the teaching perturbation distribution of the teaching sample for each teaching sample, the step of obtaining a set of referential patterns comprises the step of obtaining a set of referential patterns of the teaching samples according to the first pattern obtaining process or the second pattern obtaining process, the step of calculating a set of referential feature patterns comprises the step of calculating one referential feature pattern of one teaching sample from one referential pattern of the teaching sample according to the feature extraction matrix of the teaching sample for each teaching sample, the step of calculating an input feature pattern comprises the step of calculating an input feature pattern of the input sample from the input pattern according to the feature extraction matrix of one teaching sample for each teaching sample, and the step of selecting a specific referential feature pattern comprises the steps of estimating a similarity between one input feature pattern corresponding to one teaching sample and one referential feature pattern of the same teaching sample; and selecting a specific referential feature pattern of a specific teaching sample most similar to the input feature pattern corresponding to the teaching sample from the set of referential feature patterns.

26. A recording medium according to claim 23 in which the step of obtaining a set of second teaching patterns comprises the step of obtaining a group of second teaching patterns for each teaching sample, the step of calculating a teaching distribution of a perturbation comprises the step of calculating a teaching perturbation distribution between one first teaching pattern of one teaching sample and one group of second teaching patterns of the teaching sample for each teaching sample, the step of calculating a feature extraction matrix comprises the step of calculating a feature extraction matrix, which minimizes an overlapping area between a teaching pattern distribution of one teaching sample and the teaching perturbation distribution of the teaching sample, from the teaching pattern distribution and the teaching perturbation distribution of the teaching sample for each teaching sample, the step of obtaining a set of referential patterns comprises the step of obtaining a set of referential patterns of the teaching sample according to the first pattern obtaining process, the step of receiving an input pattern comprises the step of
obtaining a group of input patterns of the input sample according to the second pattern obtaining process, the step of calculating an input feature pattern comprises the steps of
calculating a group of input feature patterns of the input sample from the group of input patterns according to the feature extraction matrix of one teaching sample for each teaching sample; and
calculating an average input feature pattern from the group of input feature patterns for each teaching sample, and the step of selecting a specific referential feature pattern comprises the steps of
estimating a similarity between one average input feature pattern corresponding to one teaching sample and one average referential feature pattern of the same teaching sample; and
selecting a specific average referential feature pattern of a specific teaching sample most similar to the average input feature pattern corresponding to the teaching sample from the set of average referential feature patterns.

27. A recording medium for recording a software program of a pattern identity judging method executed in a computer, the pattern identity judging method, comprising the steps of:
obtaining a set of first teaching patterns from a plurality of teaching samples according to a first pattern obtaining process;
obtaining a set of second teaching patterns from the teaching samples according to a second pattern obtaining process differing from the first pattern obtaining process;
calculating a teaching pattern distribution from the set of first teaching patterns or the set of second teaching patterns;
calculating a teaching distribution of a perturbation between the set of first teaching patterns and the set of second teaching patterns;
calculating a feature extraction matrix, which minimizes an overlapping area between the teaching pattern distribution and the teaching perturbation distribution, from the teaching pattern distribution and the teaching perturbation distribution;
receiving a first input pattern of a first input sample according to the first pattern obtaining process;
calculating a first input feature pattern of the first input sample from the first input pattern according to the feature extraction matrix, the first input feature pattern being independent of the first pattern obtaining process and the second pattern obtaining process;
receiving a second input pattern of a second input sample according to the second pattern obtaining process;
calculating a second input feature pattern of the second input sample from the second input pattern according to the feature extraction matrix, the second input feature pattern being independent of the first pattern obtaining process and the second pattern obtaining process;
collating the first input feature pattern with the second input feature pattern to estimate a similarity between the first input sample and the second input sample; and
judging that the first input sample is identical with the second input sample in cases where the similarity is high.

28. A recording medium according to claim 27, in which the step of calculating a teaching pattern distribution comprises the step of
assuming a teaching pattern covariance matrix of a pattern sample space as the teaching pattern distribution, the step of calculating a teaching distribution of a perturbation comprises the steps of
calculating a teaching pattern perturbation between one first teaching pattern of one teaching sample and one second teaching pattern of the teaching sample for each teaching sample; and
assuming a teaching perturbation covariance matrix from the teaching pattern perturbations as the teaching perturbation distribution, and the step of calculating a feature extraction matrix comprises the steps of
calculating a both-diagonalizing matrix, which diagonalizes both the teaching pattern covariance matrix and the teaching perturbation covariance matrix, from the teaching pattern covariance matrix and the teaching perturbation covariance matrix;
diagonalizing the teaching pattern covariance matrix according to the both-diagonalizing matrix to produce a diagonal matrix of the teaching pattern covariance matrix;
diagonalizing the teaching perturbation covariance matrix according to the both-diagonalizing matrix to produce a diagonal matrix of the teaching perturbation covariance matrix;
calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and
calculating the feature extraction matrix from the both-diagonalizing matrix and the amplitude re-transformation matrix.

29. A recording medium according to claim 27, in which the step of obtaining a set of second teaching patterns comprises the step of
obtaining a group of second teaching patterns for each teaching sample, the step of calculating a teaching pattern distribution comprises the steps of
calculating a teaching pattern covariance matrix of a pattern sample space from the set of first teaching patterns or the set of second teaching patterns; and
assuming the teaching pattern covariance matrix as the teaching pattern distribution, the step of calculating a teaching distribution of a perturbation comprises the steps of
calculating a group of teaching pattern perturbations between one first teaching pattern of one teaching sample and one group of second teaching patterns of the teaching sample for each teaching sample;
calculating a teaching perturbation covariance matrix from one group of teaching pattern perturbations of one teaching sample for each teaching sample;
calculating an average teaching perturbation covariance matrix from the teaching perturbation covariance matrices; and
assuming the average teaching perturbation covariance matrix as the teaching perturbation distribution, the step of calculating a teaching distribution of a perturbation comprises the steps of calculating a both-diagonalizing matrix, which diagonalizes both the teaching pattern covariance matrix and the teaching perturbation covariance matrix, from the teaching pattern covariance matrix and the teaching perturbation covariance matrix;

diagonalizing the teaching pattern covariance matrix according to the both-diagonalizing matrix to produce a diagonal matrix of the teaching pattern covariance matrix;

diagonalizing the teaching perturbation covariance matrix according to the both-diagonalizing matrix to produce a diagonal matrix of the teaching perturbation covariance matrix;

calculating an amplitude re-transformation matrix, which again transforms a referential pattern covariance matrix indicated by the set of referential feature patterns to adjust amplitudes of diagonal elements of the referential pattern covariance matrix after the referential pattern covariance matrix is transformed by the both-diagonalizing matrix to be diagonalized, from the diagonal matrices; and calculating the feature extraction matrix from the both-diagonalizing matrix and the amplitude re-transformation matrix.

* * * * *

UNITED STATES PATENT AND TRADEMARK OFFICE
CERTIFICATE OF CORRECTION

PATENT NO.    : 6,628,811 B1
DATED         : November 17, 2004
INVENTOR(S)   : Kenji Nagao It is certified that error appears in the above-identified patent and that said Letters Patent is hereby corrected as shown below:

Column 38,
Line 10, change "$^T)^T$" to -- $^T)T$ --

Column 40,
Line 36, change "A" to -- $\Lambda$ --

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,628,811 B1 |
| APPLICATION NO. | : 09/271387 |
| DATED | : September 30, 2003 |
| INVENTOR(S) | : Kenji Nagao |

It is certified that error appears in the above-identified patent and that said Letters Patent is hereby corrected as shown below:

Column 38,
Line 10, change "$^T)^T$" to -- $^T)T$ --

Column 40,
Line 36, change "A" to -- $\Lambda$ --

This certificate supersedes Certificate of Correction issued April 5, 2005.

Signed and Sealed this

Ninth Day of January, 2007

JON W. DUDAS
*Director of the United States Patent and Trademark Office*